(12) United States Patent
Dally et al.

(10) Patent No.: US 9,471,091 B2
(45) Date of Patent: *Oct. 18, 2016

(54) PERIODIC SYNCHRONIZER USING A REDUCED TIMING MARGIN TO GENERATE A SPECULATIVE SYNCHRONIZED OUTPUT SIGNAL THAT IS EITHER VALIDATED OR RECALLED

(71) Applicant: NVIDIA Corporation, Santa Clara, CA (US)

(72) Inventors: William J. Dally, Los Altos Hills, CA (US); Stephen G. Tell, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 429 days.

This patent is subject to a terminal disclaimer.

(21) Appl. No.: 13/688,170

(22) Filed: Nov. 28, 2012

(65) Prior Publication Data

US 2014/0149780 A1    May 29, 2014

(51) Int. Cl.
G06F 1/24         (2006.01)
G06F 1/12         (2006.01)

(52) U.S. Cl.
CPC ...................................... *G06F 1/12* (2013.01)

(58) Field of Classification Search
CPC ......................................................... G06F 1/10
USPC .......... 375/224; 320/101; 327/153; 713/503; 711/141; 714/30
See application file for complete search history.

(56) References Cited

U.S. PATENT DOCUMENTS

| | | |
|---|---|---|
| 4,295,106 A | 10/1981 | Kahn |
| 5,309,035 A | 5/1994 | Watson, Jr. et al. |
| 5,511,100 A | 4/1996 | Lundberg et al. |
| 5,694,377 A | 12/1997 | Kushnick |
| 6,194,938 B1 | 2/2001 | Waldrop |
| 6,219,305 B1 | 4/2001 | Patrie et al. |
| 6,294,940 B1 | 9/2001 | Kiehl |
| 6,429,693 B1 | 8/2002 | Staszewski et al. |
| 6,831,490 B1 | 12/2004 | Tan et al. |
| 7,126,396 B1 | 10/2006 | Courcy |
| 7,180,332 B2 | 2/2007 | Di Gregorio |

(Continued)

FOREIGN PATENT DOCUMENTS

| | | |
|---|---|---|
| CN | 101295369 A | 10/2008 |
| CN | 102594340 A | 7/2012 |

(Continued)

OTHER PUBLICATIONS

William Dally et al., "The Even/Odd Synchronizer: A Fast, All Digital Periodic Synchronizer", 2010 IEEE, pp. 75-84.*

(Continued)

*Primary Examiner* — Aurel Prifti
(74) *Attorney, Agent, or Firm* — Zilka-Kotab, PC

(57) ABSTRACT

A method and a system are provided for speculative periodic synchronization. A phase value representing a measured phase of the second clock signal relative to the first clock signal measured at least one cycle earlier is received. A period value representing a period of the second clock signal relative to the first clock signal measured at least one cycle earlier is also received. A reduced timing margin is determined based on the phase value and the period value. A speculatively synchronized output signal is generated based on the reduced timing margin.

18 Claims, 34 Drawing Sheets

(56) References Cited

U.S. PATENT DOCUMENTS

| | | | |
|---|---|---|---|
| 7,304,510 B2 | 12/2007 | Matsuta | |
| 7,332,940 B2 | 2/2008 | Watanabe | |
| 7,333,151 B2 | 2/2008 | Ozawa | |
| 7,791,377 B2 | 9/2010 | Kim et al. | |
| 7,804,344 B2 | 9/2010 | Ma et al. | |
| 7,855,933 B2 | 12/2010 | Song et al. | |
| 7,999,531 B2 | 8/2011 | Ichiyama | |
| 8,018,258 B2 | 9/2011 | Ma et al. | |
| 8,098,085 B2 | 1/2012 | Wang et al. | |
| 8,155,236 B1 | 4/2012 | Sidiropoulos et al. | |
| 8,174,293 B2 | 5/2012 | Yoshihara et al. | |
| 8,415,983 B2 | 4/2013 | Tokairin | |
| 8,760,204 B2 | 6/2014 | Dally et al. | |
| 8,866,511 B2 | 10/2014 | Dally | |
| 9,164,134 B2 | 10/2015 | Dally et al. | |
| 2002/0158662 A1 | 10/2002 | Staszewski et al. | |
| 2002/0191727 A1 | 12/2002 | Staszewski et al. | |
| 2005/0195511 A1* | 9/2005 | Sano et al. | 360/51 |
| 2006/0220694 A1 | 10/2006 | Watanabe | |
| 2007/0165760 A1* | 7/2007 | Lee | 375/354 |
| 2007/0220337 A1* | 9/2007 | Itoh et al. | 714/30 |
| 2008/0030509 A1 | 2/2008 | Conroy et al. | |
| 2008/0303570 A1* | 12/2008 | Lee | 327/161 |
| 2009/0175116 A1 | 7/2009 | Song et al. | |
| 2009/0184742 A1* | 7/2009 | Kris | 327/160 |
| 2010/0146320 A1* | 6/2010 | Chen et al. | 713/401 |
| 2010/0321001 A1 | 12/2010 | Ichiyama | |
| 2011/0064176 A1* | 3/2011 | Takada | 375/355 |
| 2011/0102220 A1 | 5/2011 | Nam et al. | |
| 2011/0148490 A1 | 6/2011 | Lee et al. | |
| 2011/0148676 A1 | 6/2011 | Waheed et al. | |
| 2011/0163787 A1 | 7/2011 | Wan | |
| 2011/0243200 A1 | 10/2011 | Kargl et al. | |
| 2012/0069884 A1 | 3/2012 | Sakurai | |
| 2012/0233410 A1* | 9/2012 | Fu et al. | 711/141 |
| 2012/0303996 A1* | 11/2012 | Bauernfeind | 713/503 |
| 2012/0306893 A1* | 12/2012 | Liu et al. | 345/501 |
| 2012/0319883 A1 | 12/2012 | Cao et al. | |
| 2013/0121094 A1 | 5/2013 | Zerbe et al. | |
| 2013/0343441 A1* | 12/2013 | Alfieri | 375/224 |
| 2014/0062553 A1 | 3/2014 | Shim | |
| 2014/0064744 A1 | 3/2014 | Yoshiyama et al. | |
| 2014/0118030 A1 | 5/2014 | Cheng et al. | |
| 2014/0132245 A1 | 5/2014 | Dally et al. | |
| 2014/0133613 A1 | 5/2014 | Kumar et al. | |
| 2014/0139175 A1* | 5/2014 | Gonzalez | 320/101 |
| 2014/0139275 A1 | 5/2014 | Dally et al. | |
| 2014/0139276 A1* | 5/2014 | Dally | 327/153 |
| 2014/0266336 A1 | 9/2014 | Islam et al. | |
| 2014/0266353 A1 | 9/2014 | Tang et al. | |

FOREIGN PATENT DOCUMENTS

| | | |
|---|---|---|
| EP | 1285498 B1 | 11/2005 |
| TW | 442947 B | 6/2001 |
| TW | 529246 B | 4/2003 |
| TW | I309923 B | 5/2009 |
| TW | I361570 B | 4/2012 |

OTHER PUBLICATIONS

Dally, W. J. et al., "The Even/Odd Synchronizer: A Fast, All-Digital, Periodic Synchronizer," IEEE Symposium on Asynchronous Circuits and Systems, IEEE Computer Society, 2010, pp. 75-84.
Dally, W. et al., U.S. Appl. No. 12/957,262, filed Nov. 30, 2010.
Dally, W. J. et al., U.S. Appl. No. 13/676,021, filed Nov. 13, 2012.
Dally, W. J. et al., U.S. Appl. No. 13/681,929, filed Nov. 20, 2012.
Notice of Allowance from U.S. Appl. No. 13/681,929, dated Feb. 10, 2014.
Non-Final Office Action from U.S. Appl. No. 13/681,929, dated Oct. 4, 2013.
Notice of Allowance from U.S. Appl. No. 13/688,175, dated Aug. 8, 2014.
Non-Final Office Action from U.S. Appl. No. 13/688,175, dated Apr. 3, 2014.
Non-Final Office Action from U.S. Appl. No. 13/676,021, dated Mar. 13, 2015.
Dally, W. J., U.S. Appl. No. 13/688,175, filed Nov. 28, 2012.
Notice of Allowance from U.S. Appl. No. 13/676,021, dated Jun. 26, 2015.

* cited by examiner

US 9,471,091 B2

PERIODIC SYNCHRONIZER USING A REDUCED TIMING MARGIN TO GENERATE A SPECULATIVE SYNCHRONIZED OUTPUT SIGNAL THAT IS EITHER VALIDATED OR RECALLED

FIELD OF THE INVENTION

The present invention relates to circuits, and, more specifically to synchronization circuits.

BACKGROUND

Many digital systems have multiple clock domains. Thus, when signals move from one clock domain to another, they must be synchronized to avoid metastability and synchronization failure. If the two clocks have fixed frequencies, the phase relationship between the two clocks is periodic, at the beat frequency of the two clocks. By taking advantage of this periodic phase relationship, a periodic synchronizer can be simpler, have lower latency, and a lower probability of failure than a synchronizer that has to handle crossing clock domains where at least one of the clocks operates at a variable frequency.

When at least one of the clocks operates at a variable frequency, the design of the synchronizer is more complicated. Typically, signals passing between clock domains are synchronized with a periodic clock using asynchronous first-in-first outs (FIFOs). A significant area overhead is incurred for the FIFO memory. The FIFOs also add several cycles of delay as the Gray-coded input and output pointers of the FIFO must be synchronized through multiple flip-flops to reliably transmit the signals across clock domains.

There is thus a need for addressing these and/or other issues associated with the prior art.

SUMMARY

A method and a system are provided for speculative periodic synchronization. A phase value representing a measured phase of the second clock signal relative to the first clock signal measured at least one cycle earlier is received. A period value representing a period of the second clock signal relative to the first clock signal measured at least one cycle earlier is also received. A reduced timing margin is determined based on the phase value and the period value. A speculatively synchronized output signal is generated based on the reduced timing margin.

DETAILED DESCRIPTION

Figure 1A:
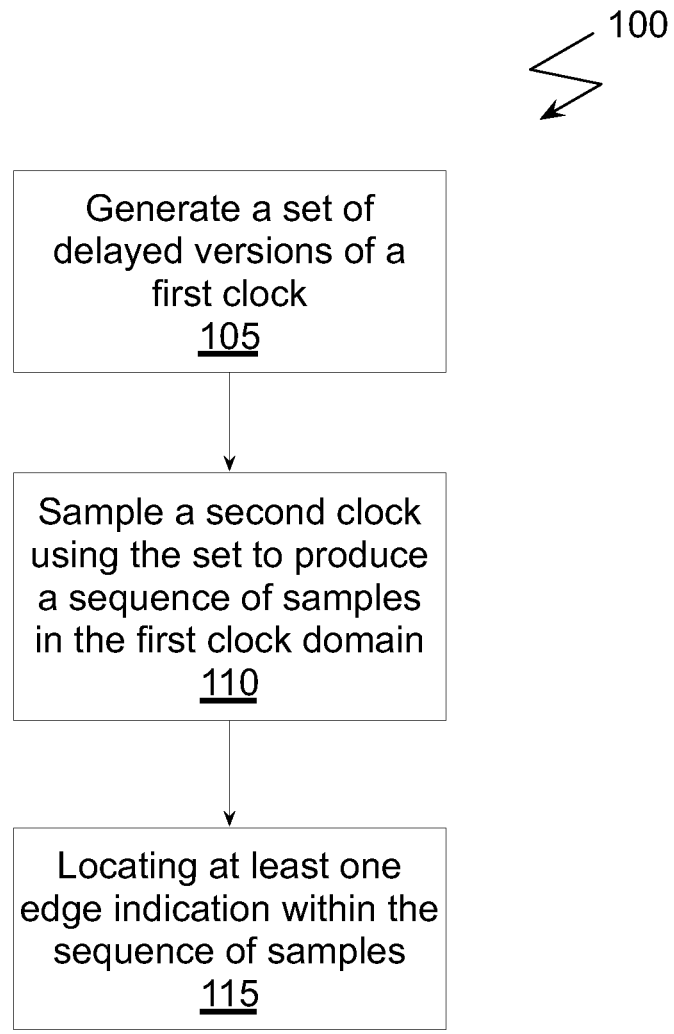
FIG. 1A illustrates a flowchart of a method for locating an edge indication within a sequence of clock signal samples, in accordance with one embodiment.

Processors used in smartphones, tablets, laptops, and other mobile devices sometimes reduce the supply voltage provided to one or more integrated circuit devices to reduce power consumption and extend the time between battery recharging. The integrated circuit devices may also vary the power supply voltage levels to different circuits within the device based on different operating modes. Power supply voltages may also change due to transients in the supply current drawn by a component. As a power supply voltage level is reduced, any clock signals dependent on the particular power supply voltage level may operate at a lower frequency. When the power supply voltage level increases, the frequency of the clock signal also increases. Because the clock frequencies may vary as a function of power supply voltage levels, conventional synchronization techniques that rely on a fixed relationship between different clock domains cannot be relied on for transmitting signals between clock domains where at least one of the clocks has a variable frequency.

Although, clock frequencies may vary in response to varying power supply voltage levels, the techniques described herein may also be applied to situations for which the clock frequencies vary for other reasons. For example, clock frequencies may vary as temperature varies or may vary as a result of programming.

With respect to the present description, a first clock domain is a clock domain of any type of system from which a signal may be sampled. For example, the first clock domain could be a clock domain of a central processing unit (CPU), a graphics processing unit (GPU), a memory controller, and/or any other system with a clock domain. The first clock domain may include a first clock signal having a particular frequency or a frequency that may vary. A second clock domain may include a second clock signal having a particular frequency or a frequency that may vary. Signals that are transmitted from the second domain to the first domain are synchronized to the first clock domain.

Rather that using a conventional synchronizer that passes signals between clock domains using asynchronous first-in, first-out buffers (FIFOs), a low latency synchronizer may be may be designed that uses the relative phase between the two clock domains. Assuming that the first clock signal is in a receiving clock domain and the second clock signal is in a transmitting clock domain, the relative phase is used to determine when signals in the transmitting clock domain may be sampled in the receiving clock domain. A high-resolution phase detector, described further herein, may be configured to track frequency transients and generate the relative phase and period between the two clock domains when one or both clock signals have varying frequencies. The high-resolution phase detector uses the first clock signal that is the local or receiving clock (clkr) and accepts the second clock signal from the transmitting clock domain (clkt). The high-resolution phase detector outputs two signals that encode: a phase value (Phase) and a period value (Period). The phase value represents the time, in clkr unit intervals (UI), from the last transition on clkt to the last transition on clkr. The period value represents the time, in clkr UI, between the last two transitions on clkt.

FIG. 1A illustrates a flowchart of a method 100 for locating an edge indication within a sequence of clock signal samples, in accordance with one embodiment. At step 105, a set of delayed versions of the first clock signal is generated. Each delayed version of the first clock signal is a different phase of the first clock signal. At step 110, the second clock signal is sampled using the set of delayed versions of the first clock signal to produce a sequence of samples in the first clock domain. Then, at step 115, at least one edge indication is located within the sequence of samples. The edge indi-cation is a rising or falling transition of a sample of the sequence of samples. The at least one edge indication may be used to compute the phase and period values.

Figure 1B:
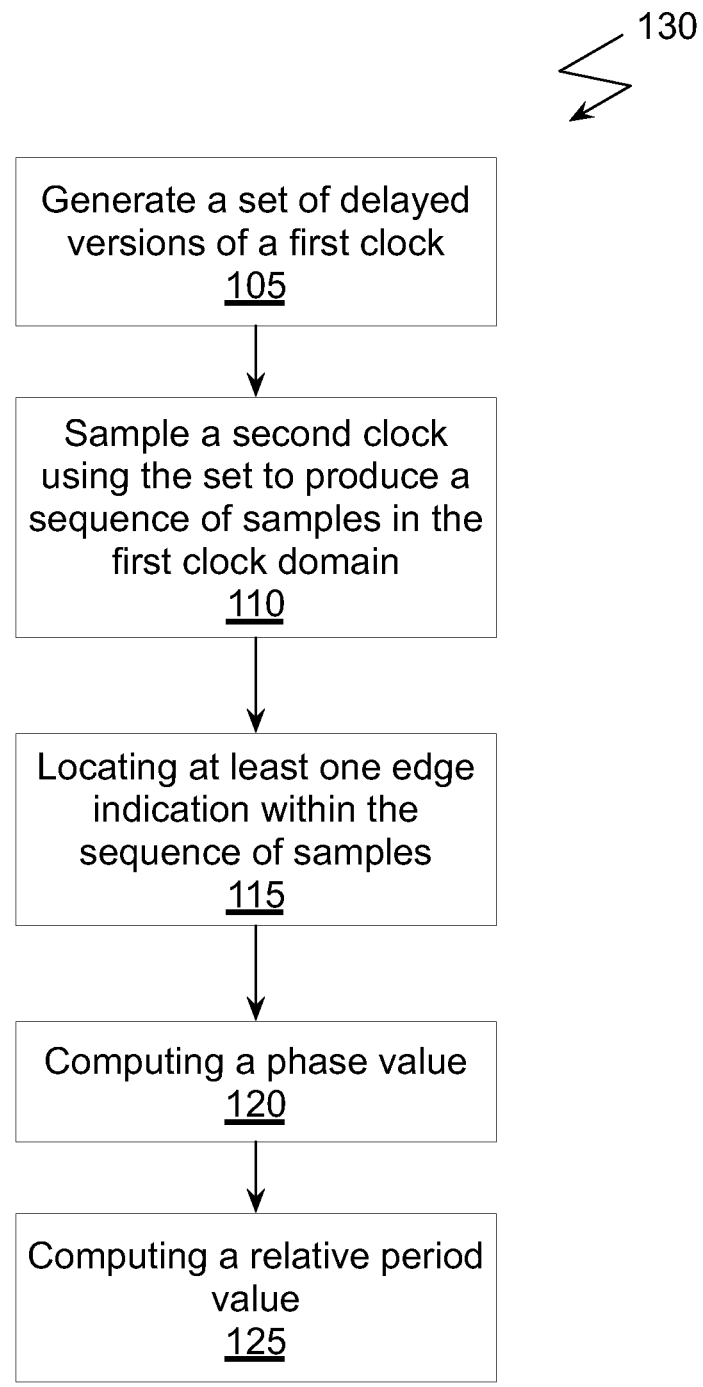
FIG. 1B illustrates a flowchart of a method for using the edge indication to detect a phase, in accordance with one embodiment.

FIG. 1B illustrates a flowchart of a method 130 for using the edge indication to detect a phase, in accordance with one embodiment. Steps 105, 110, and 115 are completed to provide at least one edge indication. At step 120, the most recent edge indication is processed to compute a phase value representing a phase of the second clock signal relative to the first clock signal. At step 125, the two most recent edge indications are processed to compute a period value representing a relative period between the second clock signal and the first clock signal.

Figure 2A:
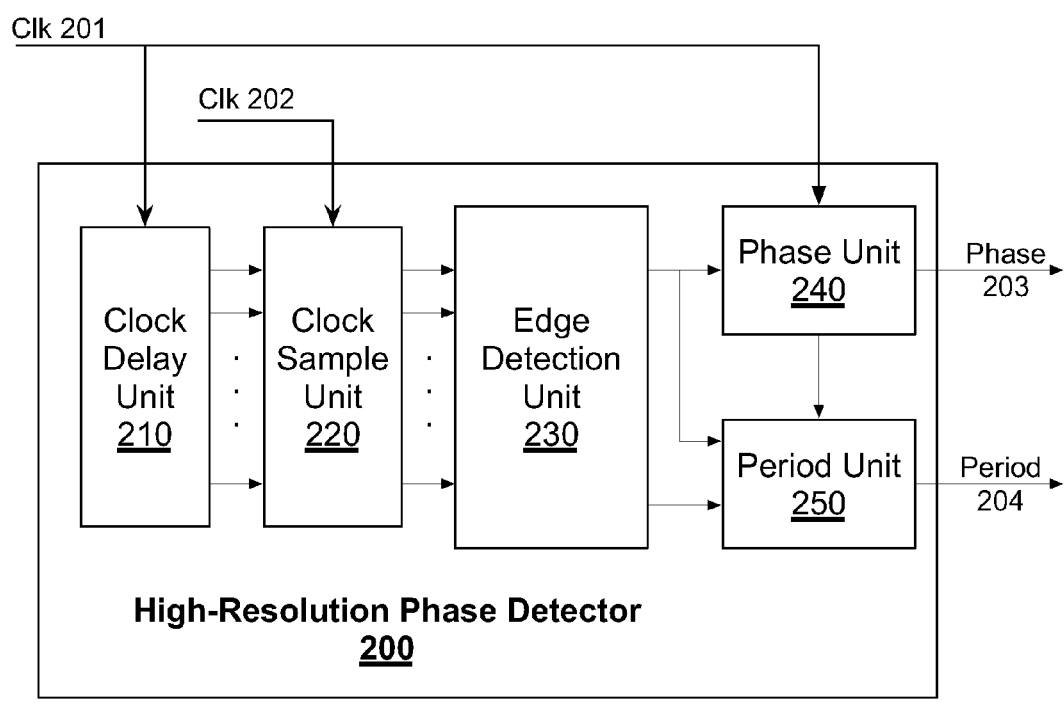
FIG. 2A illustrates a high-resolution phase detector, in accordance with one embodiment.

FIG. 2A illustrates a high-resolution phase detector 200, in accordance with one embodiment. The high-resolution phase detector 200 includes a clock delay unit 210, a clock sample unit 220, an edge detection unit 230, a phase unit 240, and a period unit 250. The high-resolution phase detector 200 receives a first clock signal, Clk 201, and a second clock signal, Clk 202, and generates two values, a phase 203 and a period 204. The phase 203 and period 204 values are each encoded by multi-bit signals. The value of phase 203 represents a phase of the second clock relative to the first clock. The value of period 204 represents a relative period between the second clock and the first clock. At least one of the first clock and the second clock may vary over time. The high-resolution phase detector 200 is designed to continuously measure the phase and period as the frequency of the first clock and/or the second clock varies.

Figure 2B:
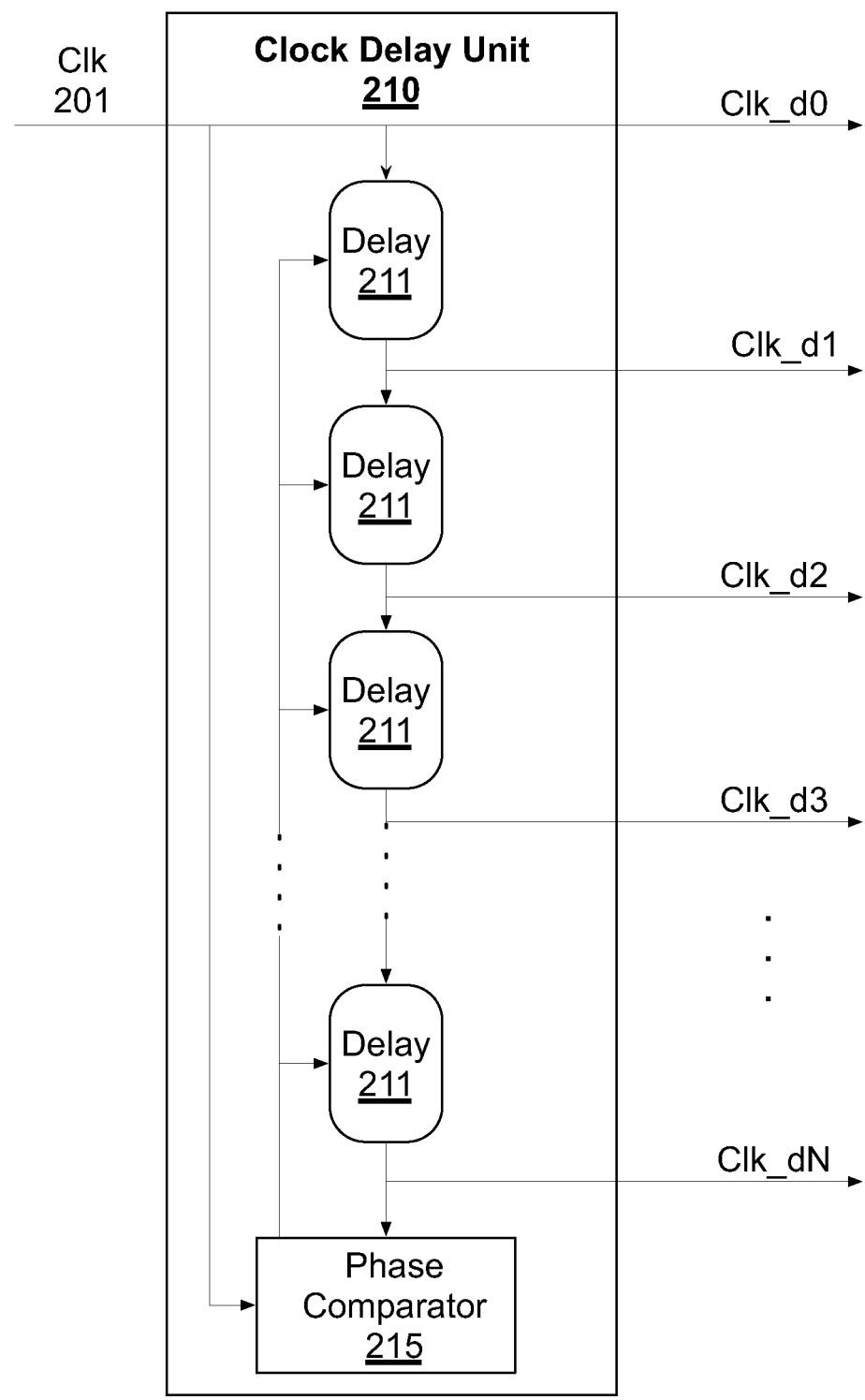
FIG. 2B illustrates a clock delay unit of FIG. 2A, in accordance with one embodiment.

FIG. 2B illustrates the clock delay unit 210 of FIG. 2A, in accordance with one embodiment. A series of N delay elements 211 produces N evenly-spaced different clock phases, delayed versions of Clk 201, specifically Clk_d0, Clk_d1, Clk_d2, Clk_d3, . . . Clk_dN. A phase comparator 215 configures the delay by which the delay elements 211 delay the respective input signals (Clk 201 and delayed versions of Clk 201) to ensure the clock phases span one period of the Clk 201, i.e., so that Clk 201=Clk_d0 has the same phase as Clk_dN. Because the phase comparator 215 controls the delay introduced by the delays elements 211, the clock delay unit 210 is a closed-loop delay circuit. The resolution of the high-resolution phase detector 200 may be increased by increasing the number of delayed versions of Clk 201 generated by the clock delay unit 210. In an alternative embodiment, the phase comparator 215 may be omitted and the clock delay line may be operated in an open-loop manner.

Figure 2C:
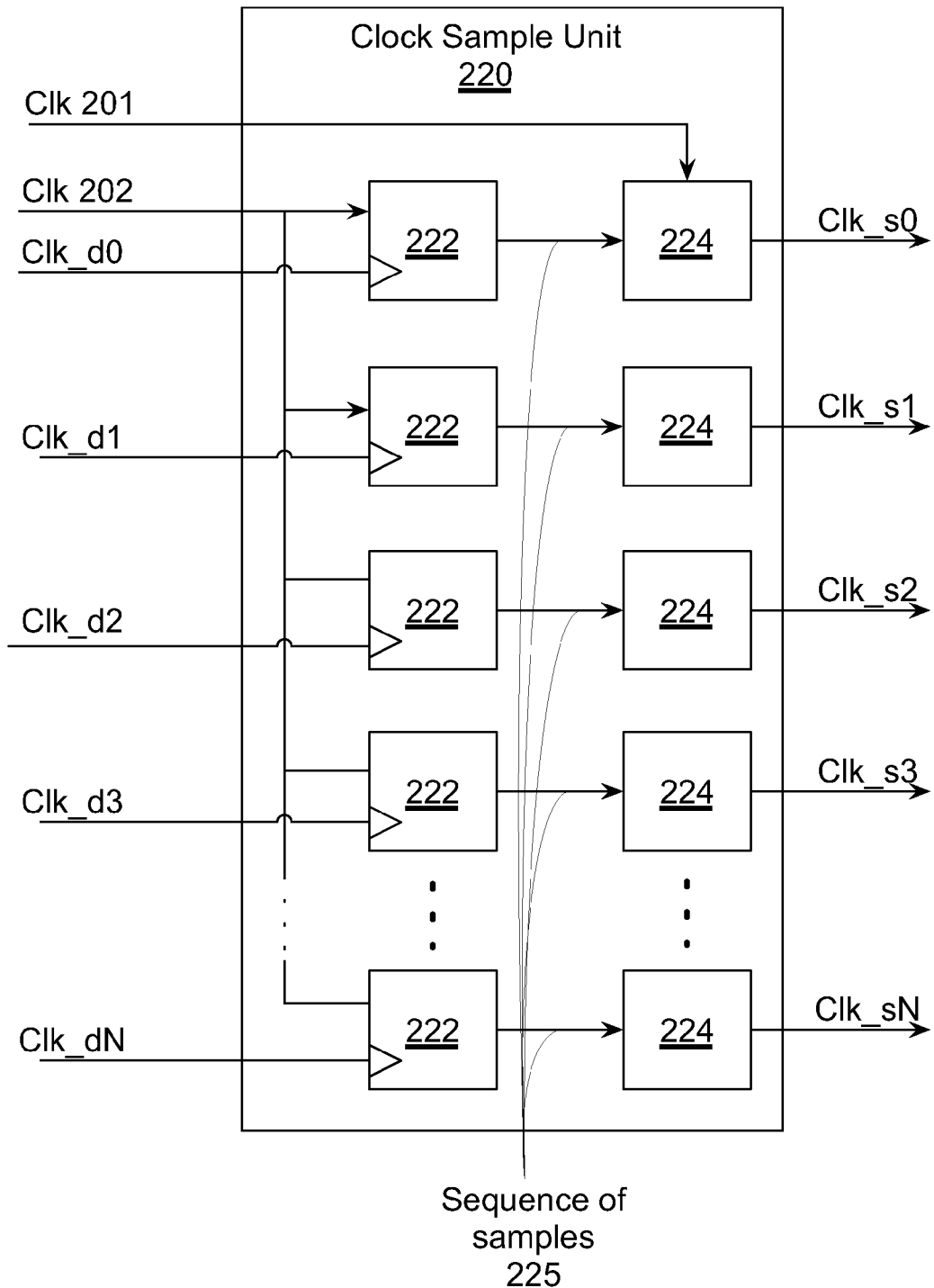
FIG. 2C illustrates a clock sample unit of FIG. 2A, in accordance with one embodiment.

FIG. 2C illustrates the clock sample unit 220 of FIG. 2A, in accordance with one embodiment. The clock sample unit 220 includes a plurality of flip-flops 222 and a corresponding plurality of synchronizers 224. The clock sample unit 220 receives the delayed versions of Clk 201 generated by the clock delay unit 210 and produces a sequence of samples of the second clock signal, Clk 202, in the domain of Clk 201. Each delayed version of the Clk 201, Clk_d0, Clk_d1, . . . Clk_dN is used to sample Clk 202, producing the sequence of samples 225 at the outputs of the flip-flops 222. The samples 225 are then retimed (to align the samples 225 with Clk 201) and synchronized (because the Clk 202 is an asynchronous signal) by the synchronizers 224 to produce the sequence of samples of Clk 202, Clk_s0, Clk_s1, Clk_s2, Clk_s3, . . . Clk_sN. The synchronizers 224 typically include one or more flip-flops, an amount that is high enough to achieve a low probability of synchronization failure. For example, 4 or 5 flip-flops in series results in a failure probability of less than $10^{-40}$.

Figure 2D:
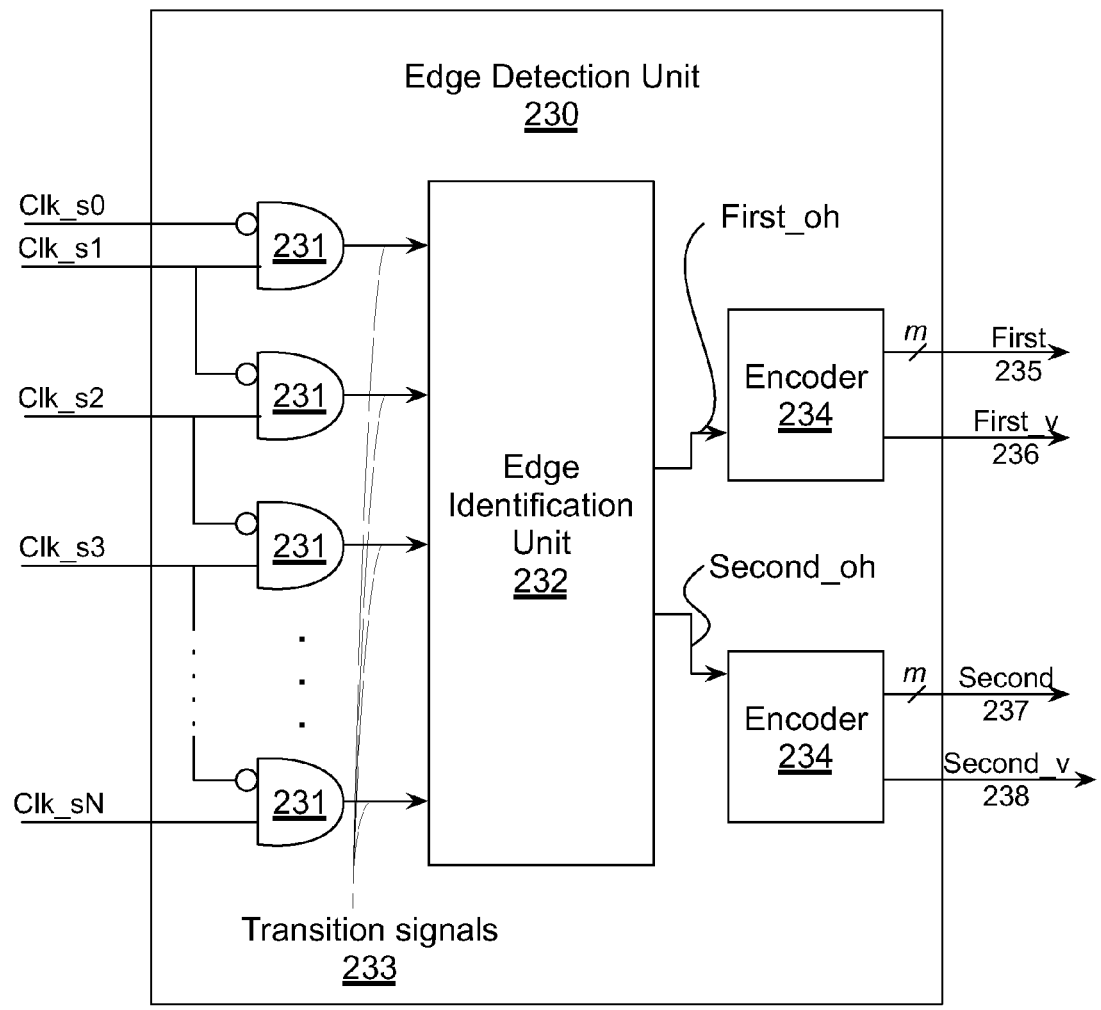
FIG. 2D illustrates an edge detection unit of FIG. 2A, in accordance with one embodiment.

FIG. 2D illustrates the edge detection unit 230 of FIG. 2A, in accordance with one embodiment. The edge detection unit 230 includes an array of AND gates 231, an edge identification unit 232, and a plurality of encoders 234. The edge detection unit 230 receives the sequence of samples Clk_s0, Clk_s1, . . . Clk_sN produced by the clock sample unit 220. The sequence of samples Clk_s0, Clk_s1, . . . Clk_sN are input to an array of AND gates 231 to locate edge indications, e.g., rising transitions within the sequence of samples. In other words, the array of AND gates 231 detect rising edges of the second clock signal, Clk 202 sampled by the first clock signal, Clk 201. In one embodiment, the edge detection unit 230 may be configured to locate edge indications that are falling transitions or both falling and rising transitions.

One or more bits of the transition signals 233, $t_i$=Clk_$s_i$ & ~Clk_$s_{i-1}$ are true if a rising edge of the Clk 202 occurred between delayed versions of the Clk 201, Clk_$d_{i-1}$ and Clk_$d_i$, where i ranges from 0 to N. For example, when a rising edge of Clk 202 occurs between Clk_d3 and Clk_d4 and a falling edge of Clk 202 occurs between Clk_d7 and Clk d8, the Clk_$s_i$ signals are 000011110 and the transition signals 233 encode the value 000010000 for i ranging 0 to N=8. The transition signals 233, $t_i$, are input to an edge identification unit 232 that finds the first bit that is true and the second bit that is true (starting from $t_N$) in the sequence of transition signals 233—if any of the bits are true. A one-hot encoding of the first bit that is true and the second bit that is true are output on signals first_oh and second_oh that are in turn encoded by the encoders 234 into m=$\log_2$(N)-bit binary signals first 235 and second 237. The transition signals 233 and/or the first_oh and second_oh signals maybe considered as edge indications. The first 235 and the second 237 values are encoded as signals and indicate the locations of the edge indications, as a number of bit positions from $t_N$ where the first and second transitions occurred respectively. For example, when the transition signals 233 encode the value 000100010, the values of first_oh and second_oh, respectively are 000000010 and 000100000. In this case the values of first 235 and second 237 respectively are ⅛ and ⅝. Because there are eight bit positions in this example, an edge detected in position i indicates an edge that occurred i/8 of a cycle before the most recent edge of the Clk 201. Signals encode the values first_v 236 and second_v 238 that are also produced by the encoders 234 to indicate if a first and second transition were found, respectively.

Figure 2E:
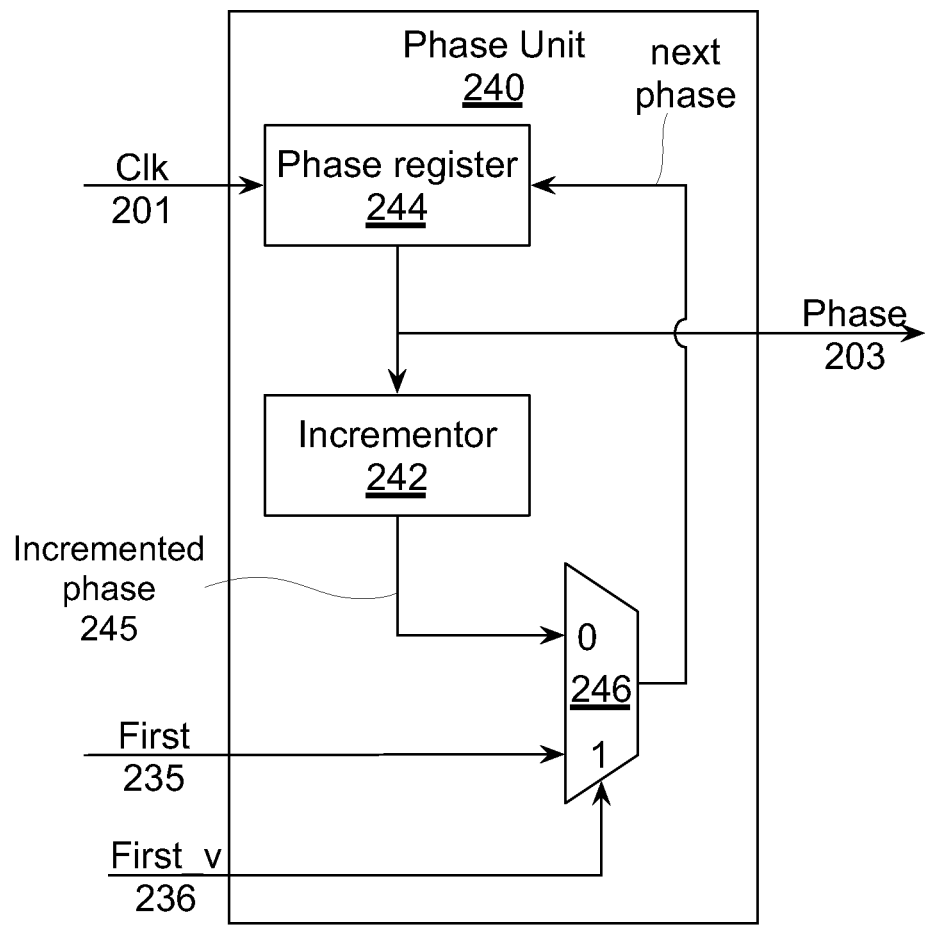
FIG. 2E illustrates a phase unit of FIG. 2A, in accordance with one embodiment.

FIG. 2E illustrates the phase unit 240 of FIG. 2A, in accordance with one embodiment. The phase unit 240 receives the values first 235 and first_v 236 from the edge detection unit 230 and generates the phase 203 value. The phase unit 240 includes a phase register 244, an incrementor 242, and a multiplexor 246. If a transition is detected, e.g., first_v 236 is asserted (is True) and first 235 equals the phase value. First 235 is a measure (in units of time) from the rising edge of Clk 201 to the most recent transition of the Clk 202. When first_v 236 is asserted, the multiplexor 246 selects the first 235 value as the output, next phase. When a transition is not detected, e.g., first_v 236 is not asserted and the multiplexor 246 selects the incremented phase 245 as the next phase. The incremented phase 245 value is computed by the incrementor 242 as phase 203 incremented by ONE. The constant ONE represents one period of the Clk 201. In the previous example—where the phase 203 value is represented in eighths of a UI, the constant ONE has the binary value 01000—representing 8/8.

Figure 2F:
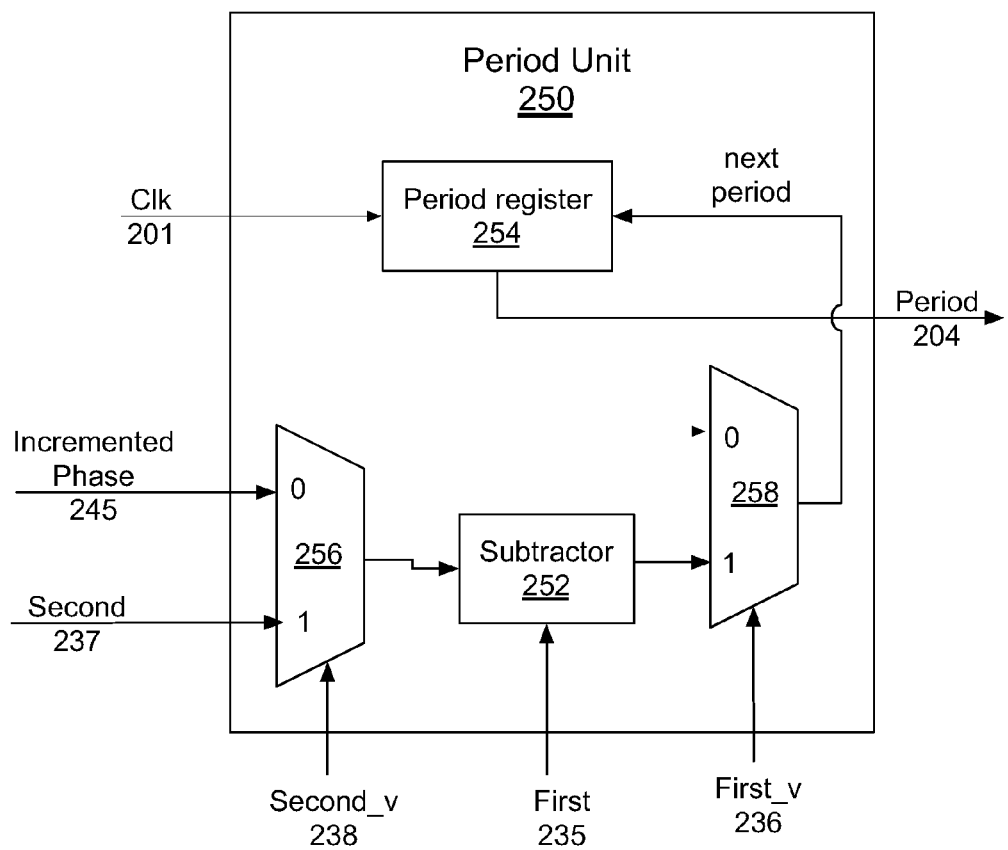
FIG. 2F illustrates a period unit of FIG. 2A, in accordance with one embodiment.

The next_phase value is input to the phase register 244 that outputs the phase 203 signal. The following Verilog may be translated to generate at a least a portion of the logic shown in the phase unit 240, in particular to provide an input (next_phase) to the phase register 244:

assign next_phase=first_v?first:phase+'ONE;

FIG. 2F illustrates the period unit 250 of FIG. 2A, in accordance with one embodiment. The period unit 250 includes a period register 254, a subtractor 252, and two multiplexors 256 and 258. The period unit 250 receives first 235, first_v 236, second 237, and second_v 238 from the edge detection unit 230 and incremented phase 245 from the phase unit 240 and generates the period 204 output signal. If no transition is detected, e.g., neither first_v 236 nor second_v 238 is asserted, the next_period (and period 204) is unchanged. Otherwise, if two transitions are detected, e.g., first_v 236 and second_v 238 are both asserted, the next_period is computed by subtracting first 235 from the phase of the previous transition, second 237. If only one transition is detected, e.g., first_v 236 is asserted, the next_period is computed by subtracting first 235 from the phase of the previous transition, incremented phase 245. In other words, the current phase, first 235 is subtracted from the phase of the last transition—either second 237, if a second transition is detected in the same period of the Clk 201, or incremented phase 245, otherwise.

When a second transition is detected, a first transition is also detected. When second_v 238 is asserted, the multiplexor 256 selects the second 237 value as the input to the subtractor 252. When a second transition is not detected, the multiplexor 256 selects the incremented phase 245 as the input to the subtractor 252. The subtractor subtracts the first 235 value from the input to generate an output. When a first transition is detected, the multiplextor 258 selects the output of the subtractor 252 as the next period. Otherwise, the multiplextor 258 selects the output of the period register 254 as the next period and the period 204 value is unchanged.

The following Verilog may be translated to generates at a least a portion of the logic shown in the period unit 250, in particular to provide an input (next_period) to the period register 254:

assign next_period = first_v ?
 (second_v ? second : (phase+`ONE))– first) : period ;

The next_period value is input to the period register 254 that outputs the period 204 signal.

In one embodiment, when Clk 201 is 1 GHz and delay elements 211 can be trimmed across process-voltage-temperature variations (PVT) to 62.5 ns, N=16 and m=4, and the constant ONE is 010000. When the value of N is a power of 2 the calculations performed by the edge detection unit 230 are simplified. The phase 203 and period 204 are represented in a fixed-point notation with m bits to the right of the binary point. The phase register 244 and period register 254 need to include sufficient bits to encode the largest possible period of Clk 202. For example, if the slowest possible Clk 202 has a period that is 5 times longer than the period of Clk 201, then three bits to the left of the binary point are required.

Because of the delay required for retiming and synchronization the values of phase 203 and period 204 reflect the phase and period of Clk 201 a fixed number of Clk 201 cycles in the past. For example when the synchronizers 224 have a delay of four cycles and a retiming delay of one cycle is introduced by the flip-flops 222, the phase 203 and period 204 values represent the state of Clk 202 five Clk 201 cycles in the past. A fast synchronizer design that uses period 204

(and possibly derivatives of period 204) to predict the phase of Clk 202 on the next cycle of Clk 201—predicts forward six cycles of Clk 201.

Figure 3A:
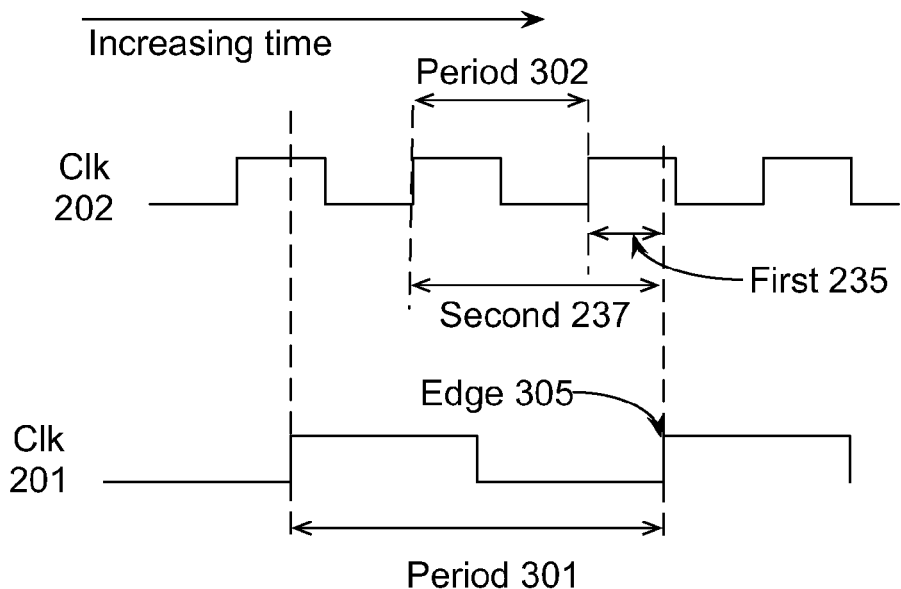
FIG. 3A illustrates waveforms of two clock signals, in accordance with one embodiment.

FIG. 3A illustrates waveforms of two clock signals, Clk 201 and Clk 202, in accordance with one embodiment. The frequency of the second clock, Clk 202 is faster than the frequency of the first clock, Clk 201. Signals are transmitted from a second clock domain corresponding to the Clk 202 to a first clock domain corresponding to the Clk 201. As shown, the period 302 of the Clk 202 is shorter than the period 301 of the Clk 201. Therefore, at least one edge indication for the Clk 202 should be detected within each clock period 301 by the edge detection unit 230. As shown, two edges of the Clk 202 occur within the period 301. At the most recent edge 305 of clock 201, the first 235 value corresponding to a first edge indication within the period 301 is computed by the edge detection unit 230. At the most recent edge 305 of the clock 201, the second 237 value corresponding to a second edge indication within the period 301 is also computed by the edge detection unit 230.

In one embodiment, the edge detection unit 230 is configured to compute a third value corresponding to a third edge indication. The third value may be used to compute a slope of the relative period when at least one of the Clk 201 and the Clk 202 is changing smoothly. The slope may be used by a synchronization unit to predict a more accurate value of the future phase and future period. Predicting the values of the phase 203 and period 204 one or more clocks ahead is useful because the current phase 203 and period 204 are valid for several clock cycles of the Clk 201 in the past due to the latency of the high-frequency phase detector 200.

Figure 3B:
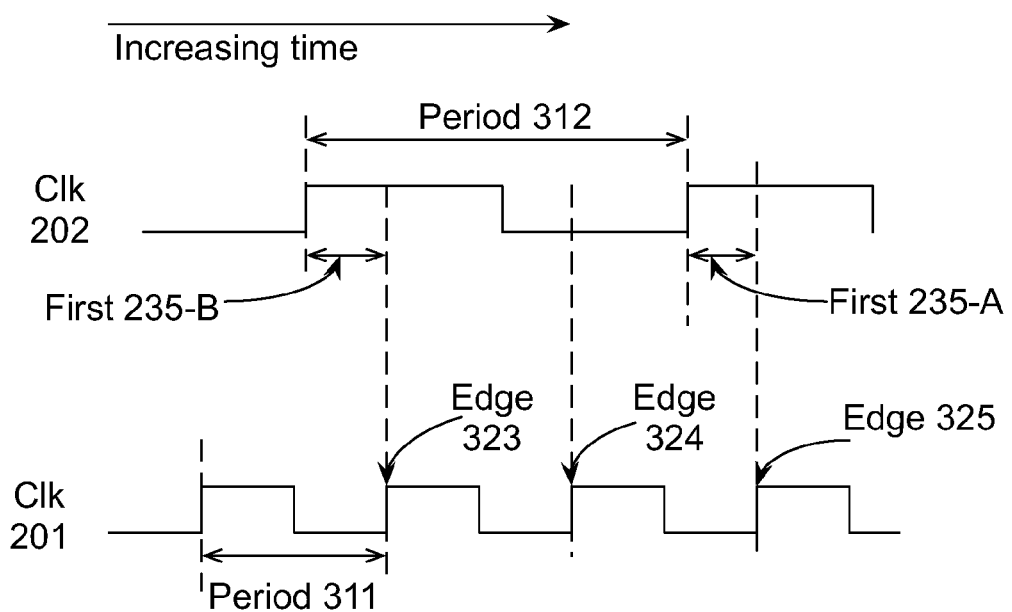
FIG. 3B illustrates other waveforms of two clock signals, in accordance with one embodiment.

FIG. 3B illustrates another example of waveforms of the two clock signals, Clk 201 and Clk 202, in accordance with one embodiment. The frequency of the transmitting clock, Clk 202 is slower than the frequency of the receiving clock, Clk 201. As shown, the period 312 of the Clk 202 is longer than the period 311 of the Clk 201. Therefore, during some periods of the Clk 201 an edge indication for the Clk 202 may not be detected by the edge detection unit 230.

At an oldest edge 323, the first 310 value corresponding to a first edge indication at the start of period 312 is located by the edge detection unit 230 and the first 235-B value is computed by the edge detection unit 230. In this example assume that the first 235-B value equals 7 units of the delay 211. Therefore, the next phase is set to 7 by the phase unit 240 and the next period is computed as the difference between phase 203 summed with N=16 and first 310. The phase 203 and period 204 are updated at the clock edge 324. At a next edge 324, no edge indication is located by the edge detection unit 230 and, the next phase is updated by the phase unit 240 as the phase 203 increased by N=16 so that the phase 203 is updated to 7+16=23. The period 204 is unchanged.

At a most recent edge 325, the first 235-A value corresponding to another first edge indication at the end of the period 312 is located by the edge detection unit 230 and the first 235-A value is computed by the edge detection unit 230. In this example assume that this additional first 235-A value equals 6 units of the delay 211. Therefore, the next phase is set to 6 by the phase unit 240 and the next period is computed as the difference between phase 203 summed with N=16 and first 235-A, i.e., 23+16−6=33. The phase 203 and period 204 are updated at the clock edge 325.

Figure 4:
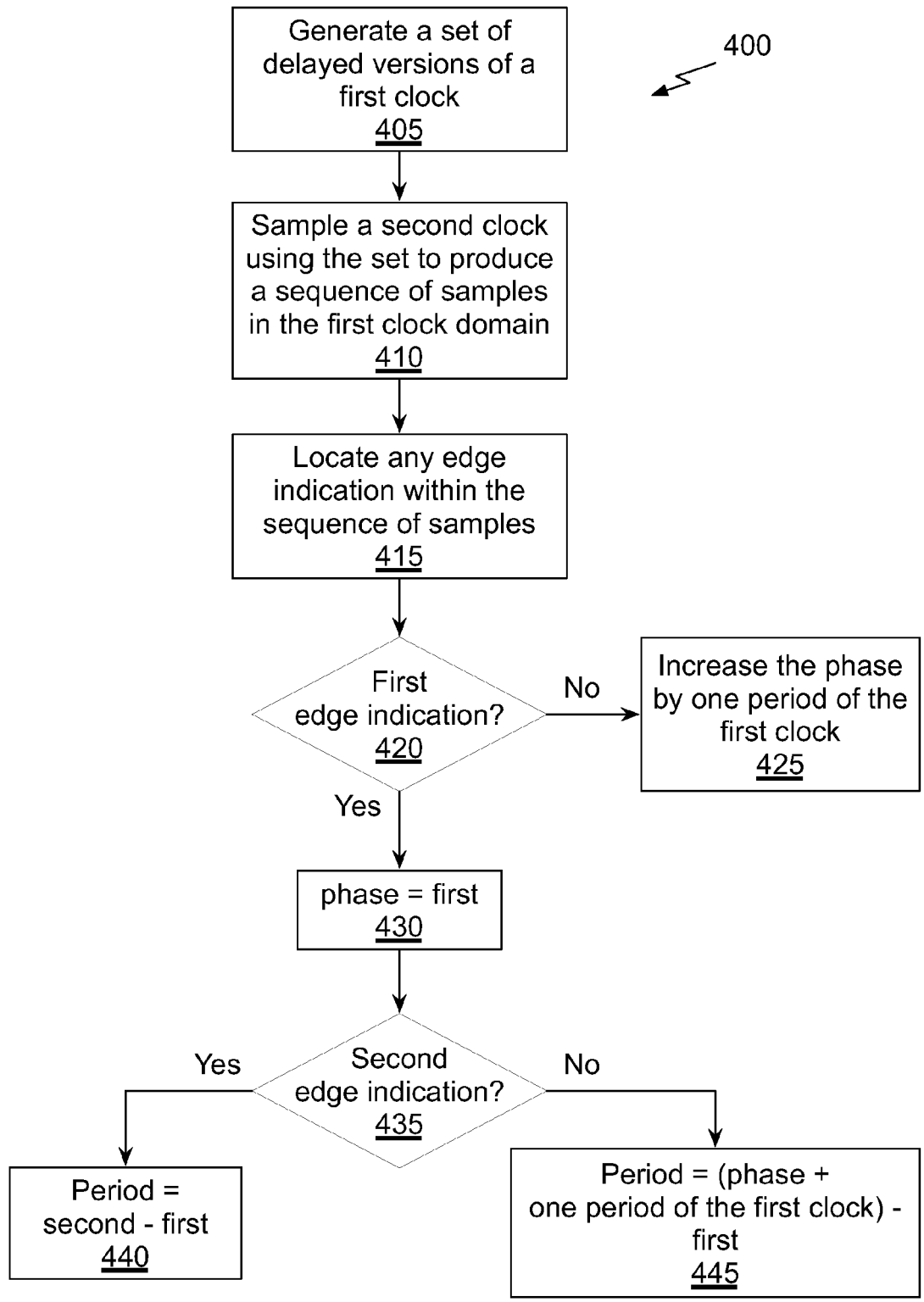
FIG. 4 illustrates a flowchart of a method for determining a phase and a period, in accordance with one embodiment.

FIG. 4 illustrates a flowchart of a method 400 for determining the phase 203 and period 204, in accordance with one embodiment. At step 405, a set of delayed versions of the Clk 201 is generated by the clock delay unit 210. At step 410, the Clk 202 is sampled by the clock sample unit 220 using the set of delayed versions of the Clk 201 to produce the sequence of samples 225 in the domain of the Clk 201. Then, at step 415, the edge detection unit 230 locates any edges, e.g., rising, falling, or rising and falling, within the sequence of samples 225.

At step 420, the phase unit 240 determines if a first edge indication was detected by the edge detection unit 230, and, if not, at step 425 the phase 203 is updated to the phase 203 increased by one period of Clk 201, e.g., phase+ONE. When first edge indication is not detected by the edge detection unit 230, the period 204 is not changed. Otherwise, when a first edge indication is detected, at step 430 the phase unit 240 sets the phase 203 equal to the first 235 signal generated by the edge detection unit 230. At step 435, the period unit 250 determines if a second edge indication is detected by the edge detection unit 230, and, if so, then at step 440 the period unit 250 sets the period 204 equal to the difference between the second 237 signal and the first signal 235. Otherwise, at step 445, the period unit 250 updates the period 204 to the difference between the sum of the phase 203 and one period of the Clk 201 and the first 235 signal.

Figure 5A:
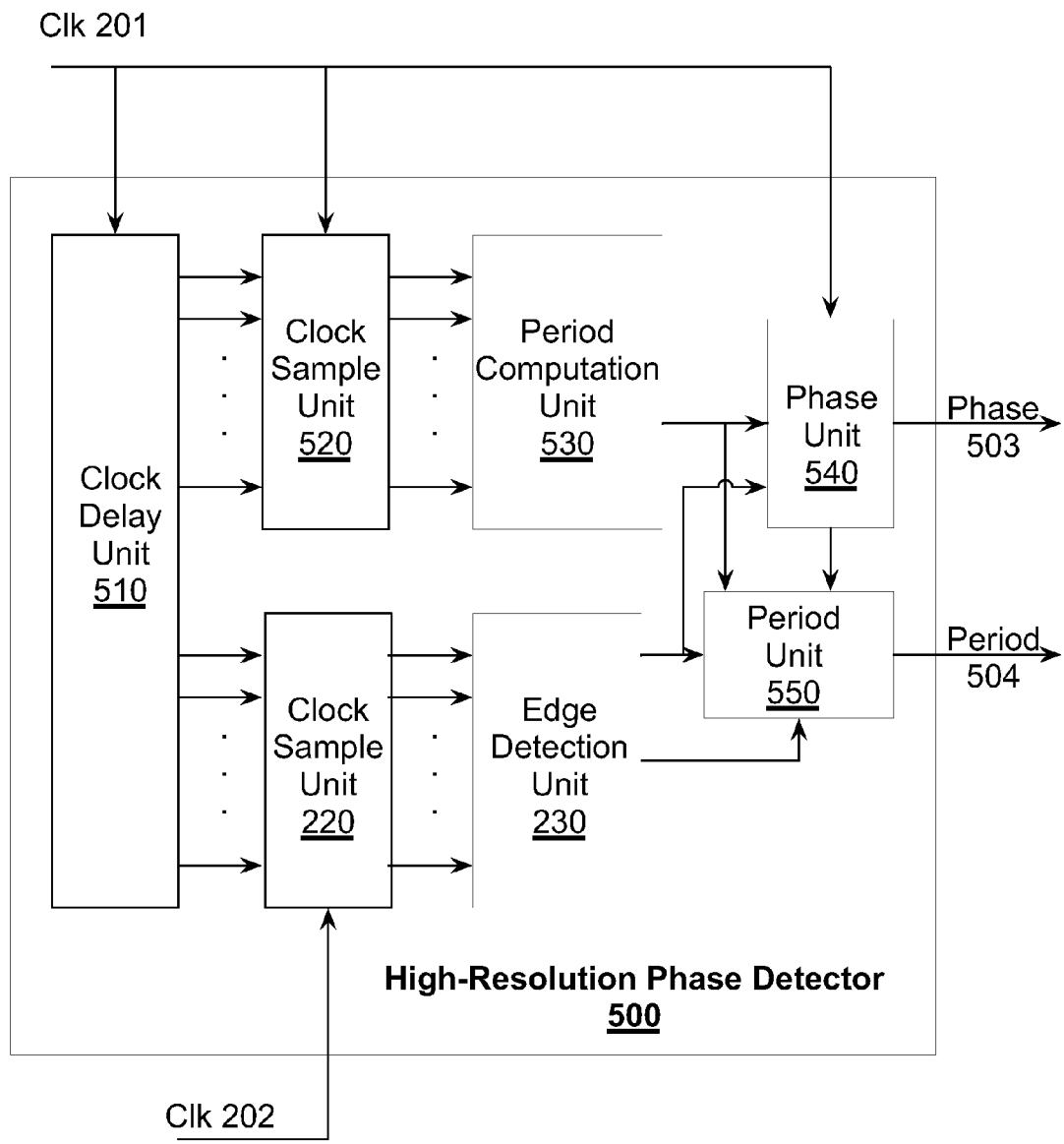
FIG. 5A illustrates another high-resolution phase detector, in accordance with one embodiment.

FIG. 5A illustrates a high-resolution phase detector 500, in accordance with one embodiment. The high-resolution phase detector 500 includes an open-loop clock delay unit 510, the clock sample unit 220, a clock sample unit 520, the edge detection unit 230, a period computation unit 530, a phase unit 540, and a period unit 550. The high-resolution phase detector 500 receives a first clock, Clk 201, and a second clock, Clk 202, and generates two values, a phase 503 and a period 504.

Figure 5B:
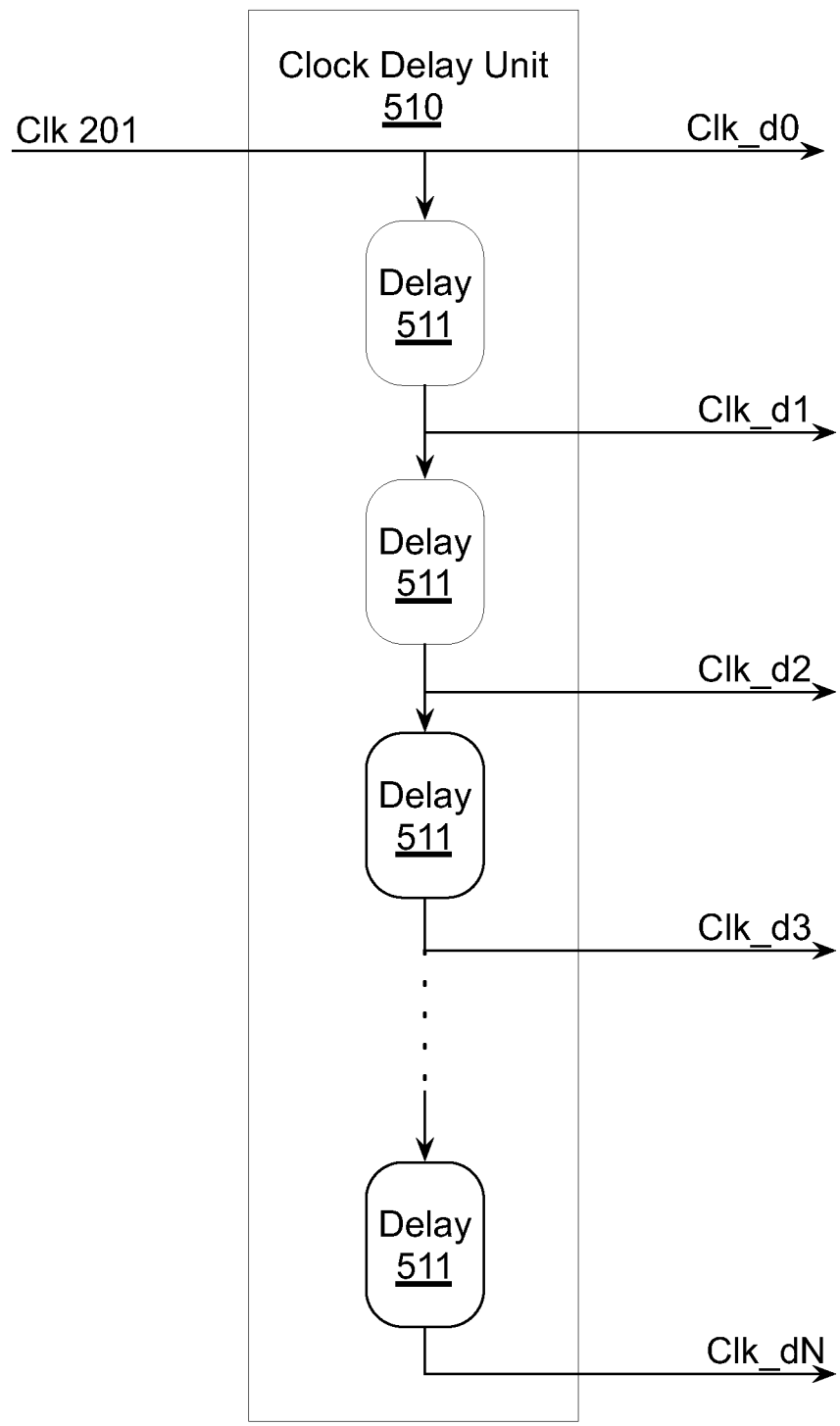
FIG. 5B illustrates an open-loop clock delay unit of FIG. 5A, in accordance with one embodiment.

FIG. 5B illustrates the open-loop clock delay unit 510 of FIG. 5A, in accordance with one embodiment. The open-loop clock delay unit 510 replaces the clock delay unit 210 in the high-resolution phase detector 500 compared with the high-resolution phase detector 200. A series of N delay elements 511 produces N clock phases, e.g., delayed versions of Clk 201, specifically Clk_d0, Clk_d1, Clk_d2, Clk_d3, . . . Clk_dN. Unlike the clock delay unit 210, the N clock phases do not necessarily span exactly one clock cycle because the open-loop clock delay unit 520 does not include a phase comparator 215 to control the amount by which each of the delay elements 511 delays the Clk 201 to generate the delayed versions of the Clk 201. The number of delay elements 511 should be high enough so that at least one period of the Clk 201 is sampled.

Figure 5C:
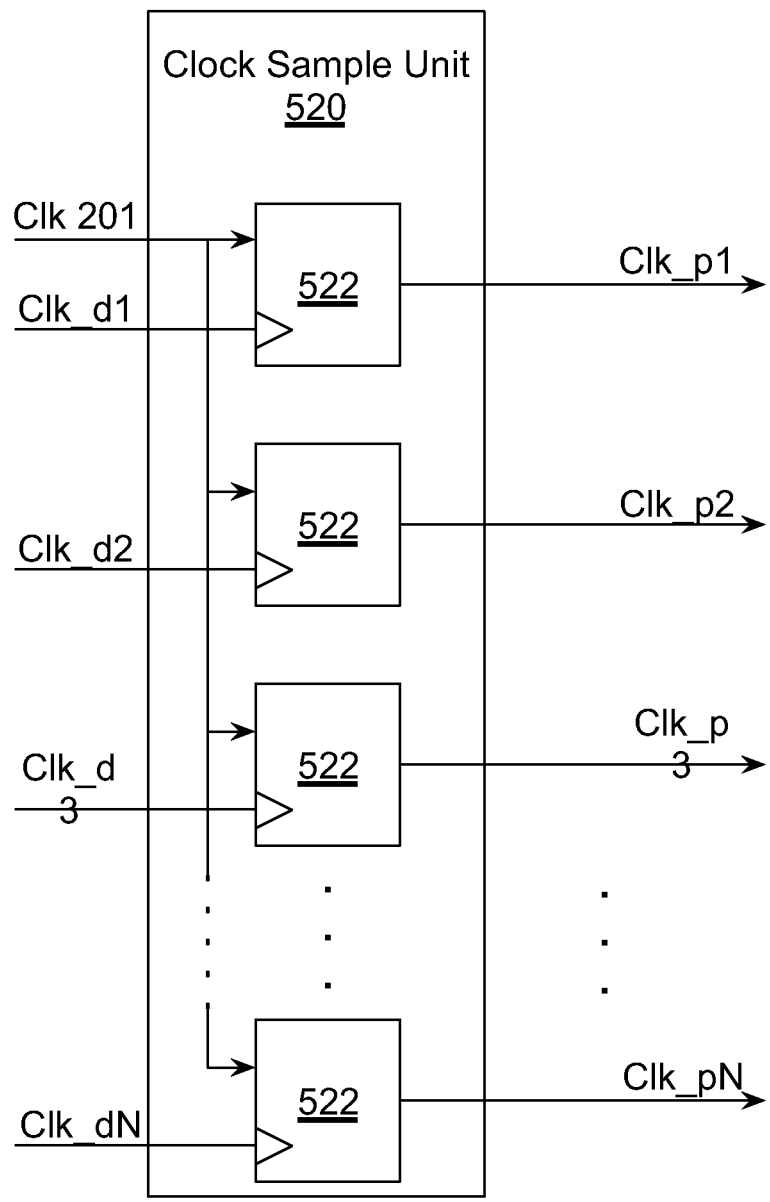
FIG. 5C illustrates a clock sample unit of FIG. 5A, in accordance with one embodiment.

FIG. 5C illustrates the clock sample unit 520 of FIG. 5A, in accordance with one embodiment. The clock sample unit 520 includes a plurality of flip-flops 522. The clock sample unit 520 receives the delayed versions of Clk 201 generated by the clock delay unit 210 and produces a sequence of samples of the first clock signal, Clk 201. Sampling the first clock signal is performed to compute the period of the Clk 201 in units of the delay introduced by one delay element 511. Each clock phase, Clk_d0, Clk_d1, . . . Clk_dN is used to sample Clk 201, producing the sequence of first clock samples at the outputs of the flip-flops 522, e.g., Clk_p1, Clk_p2, Clk_p3, . . . Clk_pN.

Figure 5D:
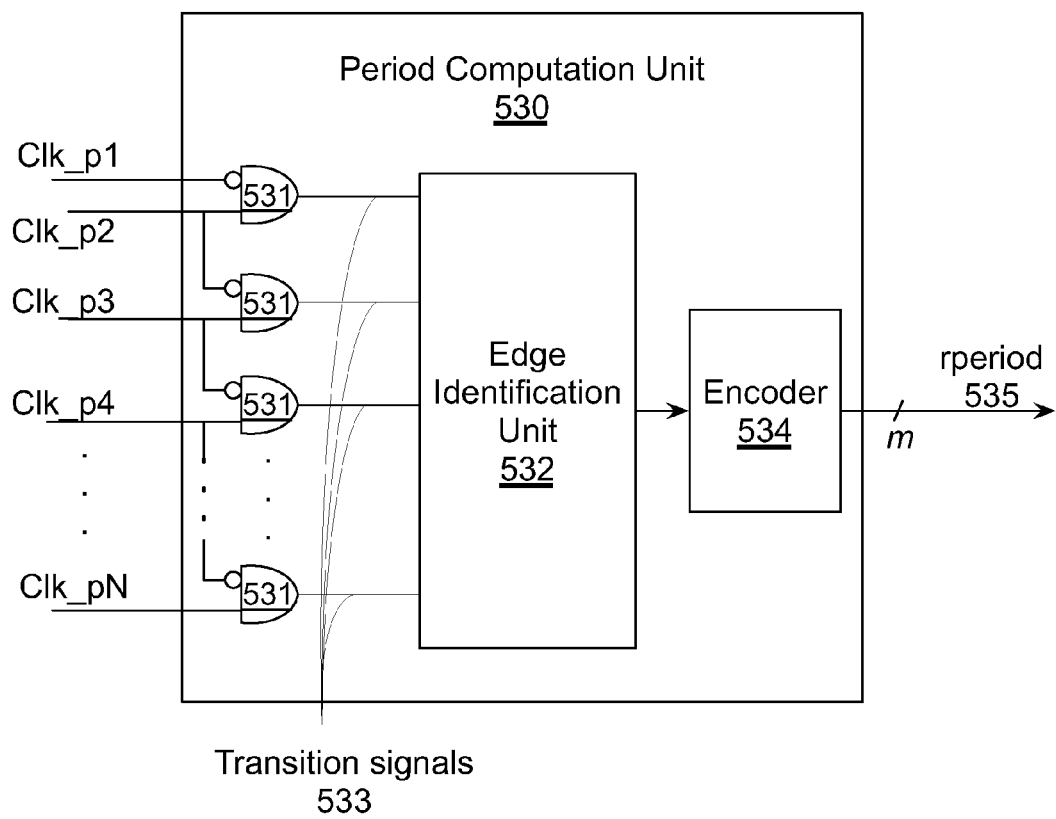
FIG. 5D illustrates a period computation unit of FIG. 5A, in accordance with one embodiment.

FIG. 5D illustrates the period computation unit 530 of FIG. 5A, in accordance with one embodiment. The period computation unit 530 includes an array of AND gates 531, an edge identification unit 532, and an encoder 534. The period computation unit 530 receives the sequence of first clock samples Clk_p1, Clk_p2, . . . Clk_pN produced by the clock sample unit 520. The sequence of first clock samples Clk_p1, Clk_p2, . . . Clk_pN are input to the array of AND gates 531 to locate rising transitions, e.g., edges, within the sequence of first clock samples. In other words, the AND gates 531 detect rising edges of the first clock signal 201 sampled by delayed versions of the first clock signal 201. The AND gates 531 generate transition signals 533 that may be used to compute the period of the Clk 201. The AND gates 531 receiving at least one of Clk_p1 and Clk_p2 may be ignored by the edge identification unit 532 to ensure that metastable signals are not sampled. In one embodiment, the period computation unit 530 may be configured to locate falling transitions or both falling and rising transitions.

One or more bits of the transition signals 533, $t_i$=Clk_$p_i$&~Clk_$p_{i-1}$ are true if a rising edge of the Clk 201 occurred between delayed versions of the Clk 201, Clk_$d_{i-1}$ and Clk_$d_i$, where i ranges from 0 to N. The transition signals 533, $t_i$, are input to the edge identification unit 532 that finds the first one (where one is a bit that is true) in the sequence of transition signals 533. The binary encoding of the position at which the first edge is detected is rperiod 535—the period of Clk 301 in units of the delay of one delay 511.

Figure 5E:
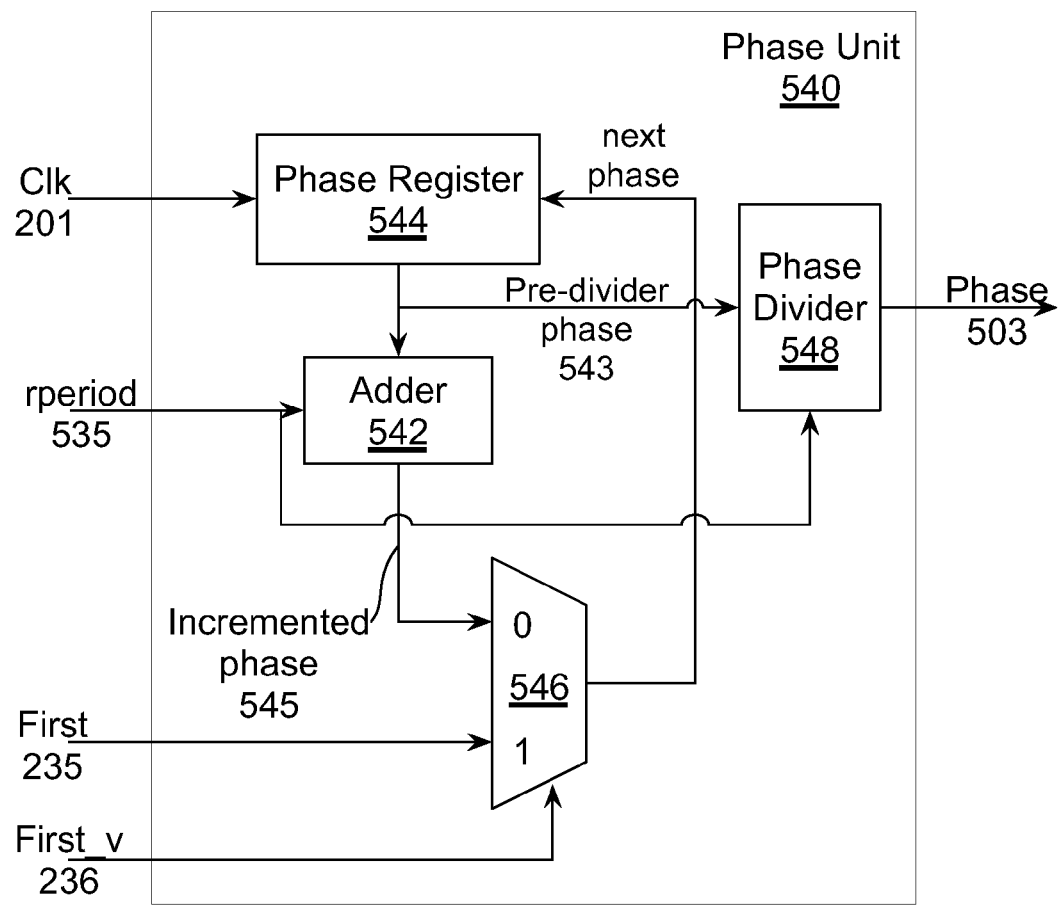
FIG. 5E illustrates a phase unit of FIG. 5A, in accordance with one embodiment.

FIG. 5E illustrates the phase unit 540 of FIG. 5A, in accordance with one embodiment. The phase unit 540 includes a phase register 544, an adder 542, a multiplexor 546, and a phase divider 548. The phase unit 540 receives first 235 and first_v 236 from the edge detection unit 230 and rperiod 535 from the period computation unit 530 and generates the phase 503 output signal. The value rperiod 535 is used in the phase unit 540 in place of the constant ONE in the phase unit 240. Also, the value of phase produced by the phase unit 540 is divided by rperiod 535 for use by a fast periodic synchronizer.

First 235 is a measure (in units of time) from the rising edge of Clk 201 to the most recent transition of the Clk 202. If a transition is detected, e.g., first_v 236 is asserted, first 235 gives the phase value. When first_v 236 is asserted, the multiplexor 546 selects the first 235 value as the output, next phase. When a transition is not detected, e.g., first_v 236 is not asserted, the multiplexor 546 selects incremented phase 545 as the next phase. The incremented phase 545 value is computed by the adder 542 as the pre-divider phase 543 incremented by rperiod 535.

The next_phase value is input to the phase register 544 that outputs the pre-divider phase 543 value. The following Verilog may be translated to generate at a least a portion of the logic shown in the phase unit 540, in particular to provide an input (next_phase) to the phase register 544:
  assign next_phase=first_v?first:predivider_phase+rperiod;
The output of the phase register 544, e.g., pre-divider phase 543, is divided by rperiod 535 within the phase divider 548 to produce the phase 503 value.

Figure 5F:
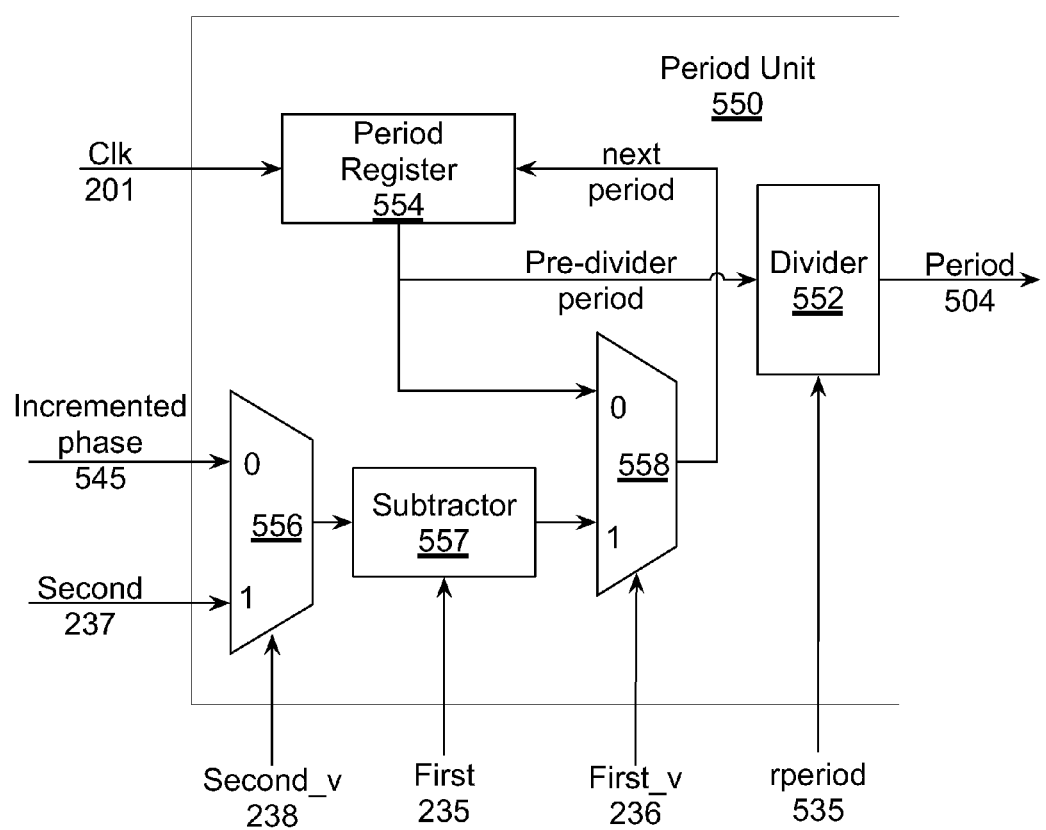
FIG. 5F illustrates a period unit of FIG. 5A, in accordance with one embodiment.

FIG. 5F illustrates the period unit 550 of FIG. 5A, in accordance with one embodiment. The period unit 550 includes a period register 554, a subtractor 557, multiplexor 556, multiplexor 558, and a divider 258. The period unit 550 receives first 235, first_v 236, second 237, and second_v 238 from the edge detection unit 230, rperiod 535 from the period computation unit 530, and incremented phase 545 from the phase unit 540 and generates the period 504 output signal.

If no transition is detected, e.g., neither first_v 236 nor second_v 238 is asserted, the next_period (and period 504) is unchanged. Otherwise, if two transitions are detected, e.g., first_v 236 and second_v 238 are both asserted, the next_ period is computed by subtracting first 235 from the phase of the previous transition, second 237. If only one transition is detected, e.g., first_v 236 is asserted, the next_period is computed by subtracting first 235 from the phase of the previous transition, incremented phase 545. In other words, the current phase, first 235 is subtracted from the phase of the last transition—either second 237 if a second transition is detected in the same period of the Clk 201 or incremented phase 545 otherwise. The number of bits for dividers 548 and 552 is determined by the number of bits in rperiod 535, e.g., 4 bits if N=16. Note that N may be any integer value and N need not be a power of two.

When a second transition is detected, a first transition is also detected. When second_v 238 is asserted, the multiplexor 556 selects the second 237 value as the input to the subtractor 557. When a second transition is not detected, the multiplexor 556 selects the incremented phase 245 as the input to the subtractor 557. The subtractor subtracts the first 235 value from the input to generate an output. When a first transition is detected, the multiplexor 558 selects the output of the subtractor 252 as the next period. Otherwise, the multiplexor 558 selects the output of the period register 554 as the next period and the period 204 value is unchanged.

The following Verilog may be translated to generate at a least a portion of the logic shown in the period unit 550, in particular to provide an input (next_period) to the period register 554:

assign next_period = first_v ?
  ((second_v ? second : (pre-divider phase+rperiod))– first) : period ;

The next_period value is input to the period register 554. The output of the period register 554, e.g., pre-divider period, is divided by rperiod 535 within the period divider 552 to produce the period 504 value.

Figure 5G:
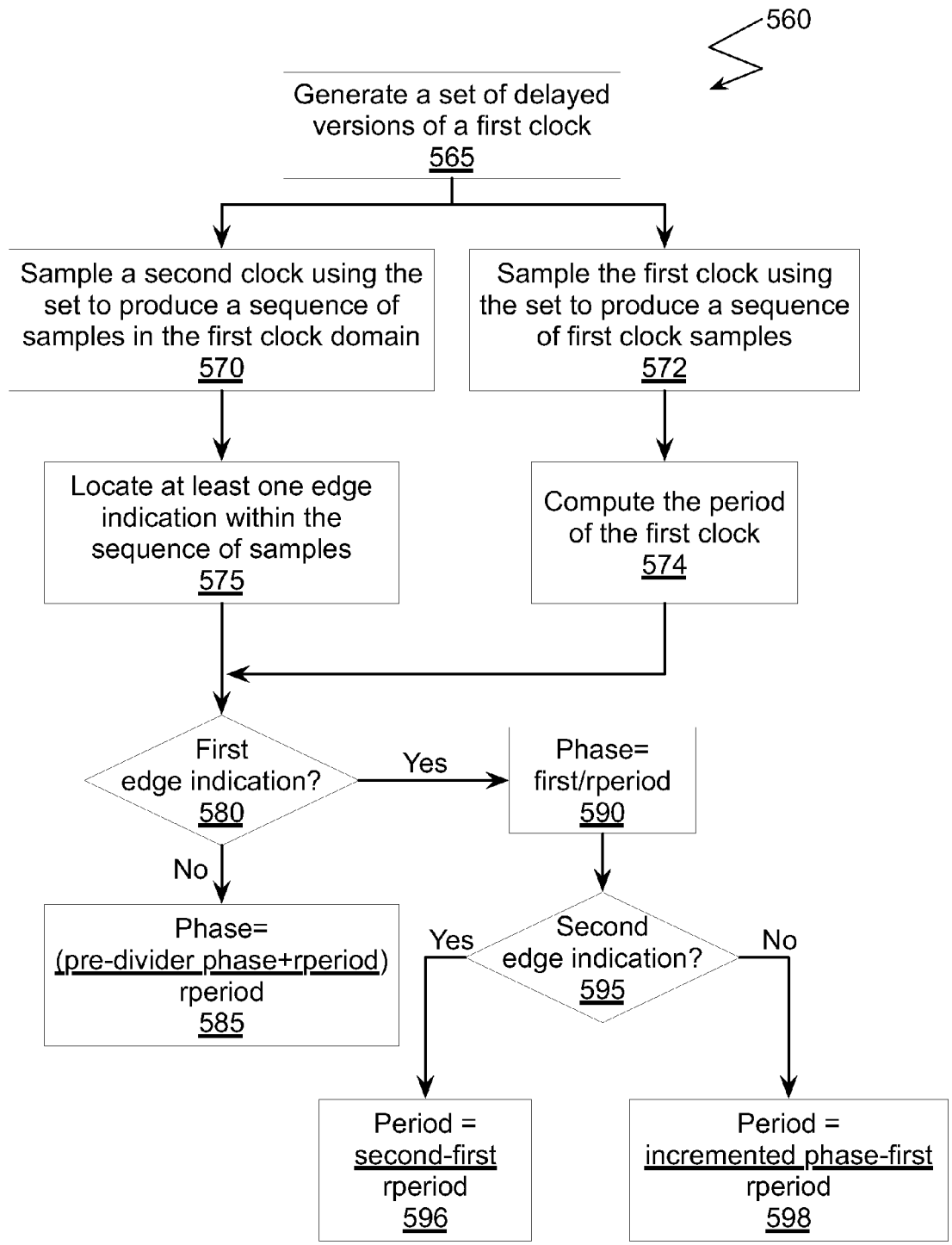
FIG. 5G illustrates another flowchart of a method for determining a phase and a period, in accordance with one embodiment.

FIG. 5G illustrates another flowchart of a method 560 for determining the phase 503 and period 504 using the open-loop high-resolution phase detector 500, in accordance with one embodiment. At step 565, a set of delayed versions of the Clk 201 is generated by the open-loop clock delay unit 510. At step 570, the Clk 202 is sampled by the clock sample unit 220 using the set delayed versions of the Clk 201 to produce the sequence of samples 225 in the domain of the Clk 201. Then, at step 575, the edge detection unit 230 locates any edges, e.g., rising, falling, or rising and falling, within the sequence of samples 225.

At step 572, the Clk 201 is sampled by the clock sample unit 520 using the set delayed versions of the Clk 201 to produce the sequence of first clock samples 525 in the domain of the Clk 201. Then, at step 574, the period computation unit 530 locates an edge, e.g., rising, falling, or rising and falling, within the sequence of first clock samples 525 and determines the rperiod 535, e.g., the period of the Clk 201. One or more of steps 572 and 574 may be performed in parallel with one or more of steps 570 and 575.

At step 580, the phase unit 540 determines if a first edge indication was detected by the edge detection unit 230, and, if not, at step 585 the next phase is computed as the sum of the pre-divider phase 543 increased by one period of the Clk 201 (rperiod 535). The next phase is then divided by one period of the Clk 201 to generate the phase 503 value, e.g., (pre-divider_phase+rperiod)/rperiod. When first edge indication is not detected by the edge detection unit 230, the period 504 is not changed. Otherwise, when a first edge indication is detected, at step 590, the phase unit 540 the next phase is set equal to the first 235 signal generated by the edge detection unit 230. The next phase is then divided by rperiod 535 to generate the phase 503 value. At step 595, the period unit 550 determines if a second edge indication is detected by the edge detection unit 230, and, if so, then at step 598 the period unit 550 sets the period 504 equal to the difference of the second 237 value and the first 235 value divided by the rperiod 535. Otherwise, at step 598, the period unit 550 updates the period 504 to the difference between the sum of the pre-divider phase 503 and one period of the Clk 201 (incremented phase 542) and the first 235 signal divided by one period of the Clk 201 (i.e., rperiod 535).

Figure 6A:
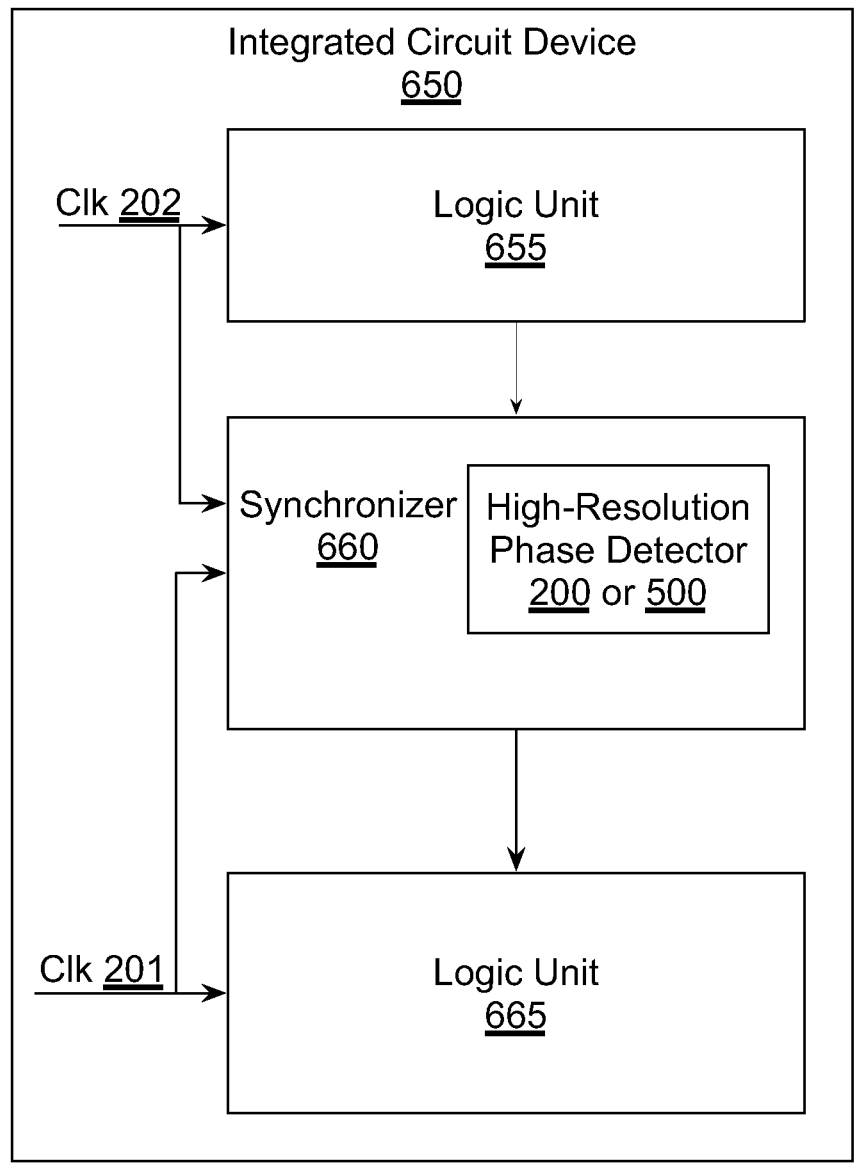
FIG. 6A illustrates an exemplary integrated circuit in which the various architecture and/or functionality of the various previous embodiments may be implemented.

FIG. 6A illustrates an exemplary integrated circuit device 650 in which the various architecture and/or functionality of the various previous embodiments may be implemented. The integrated circuit device 650 includes a logic unit 655, a synchronizer 660, and a logic unit 665. The logic unit 655 receives the clock 202 and generates outputs that are synchronous with the clock 202. The outputs are received by the synchronizer 660 and are transmitted from the clock domain of the clock 202 to the clock domain of the clock 201 using the phase 203 and period 204 values computed by the high-resolution phase detector 200 or 500. The transmitted outputs that are synchronized to the clock domain of the clock 201 are received by the logic unit 665.

A Variation-Tolerant Periodic Synchronizer

When provided with the phase 203 and period 204 values, a variation-tolerant synchronizer may be configured to synchronize signals transmitted from a second clock domain corresponding to the first clock signal, Clk 202, and received in a first clock domain corresponding to the second clock signal, Clk 201. The variation-tolerant synchronizer can tolerate rapid changes in clock periods of the first and/or second clock signals—subject to a maximum variation in phase per cycle of the first clock signal relative to the second clock signal. Therefore, the variation-tolerant synchronizer can be used in integrated circuit devices that employ voltage-tracking clock generators. The variation-tolerant synchronizer may also synchronize signals with low latency during power state transitions when the first and/or second clock signals can change frequency.

The high-resolution phase detector 200 or 500 may be configured, as previously described, to measure the next phase and next period of the Clk 202 and update the phase 203 and period 204 values at the end of each cycle of the Clk 201, e.g., at the rising edge of the Clk 201. The phase indicates the time from the last transition of the Clk 202 to the last transition of the Clk 201. The period is the time between two transitions of the Clk 202.

To perform synchronization with low latency, the variation-tolerant synchronizer samples the signals to be synchronized at various transitions of the Clk 202. In one embodiment, two registers are used to separately sample "even" and "odd" transitions. In other words, every other cycle of the Clk 202 an "even" register samples and stores the signals to be synchronized. An "odd" register samples and stores the signals to be synchronized on the non-even cycles (odd cycles) of the Clk 202. Each phase 203 value is associated with an indication of whether the measured phase corresponds to an even edge or an odd edge of the Clk 202. When more than two registers sample and store the signals to be synchronized, the indication specifies the respective periodic transition, e.g., first edge, second edge, third edge, etc., of the Clk 202.

Because of retiming and synchronization delays the phase 203 and period 204 values reflect the state of the Clk 202 D cycles of the Clk 201 in the past. To select an output of the proper register sampling the signals to be synchronized (even/odd or first/second/third edge, etc.) one or more values of the phase 203 in the future cycles of the Clk 201 are extrapolated. More specifically, the phase 203 S=D+1 cycles in the future is extrapolated from the current values of the phase 203 and period 204. Intervening future values of the phase 203 are also extrapolated when D is greater than zero. A series of phase values including the extrapolated values of the phase 203 is searched to identify the register sampling the signals to be synchronized that is the most recently written register that is safe to select to generate synchronized signals in the first clock domain that corresponds to the Clk 201.

To reduce the latency incurred by the signals transmitted through the variation-tolerant synchronizer, the edge of the Clk 202 that occurs just before the next edge of the Clk 201, based on the series of phase values, is identified. The edge that is identified needs to have sufficient timing margin so that the sampled signals are stable. The register associated with the identified edge (even/odd or first/second/third edge) is selected for output by the variation-tolerant synchronizer to produce the synchronized signals.

Figure 6B:
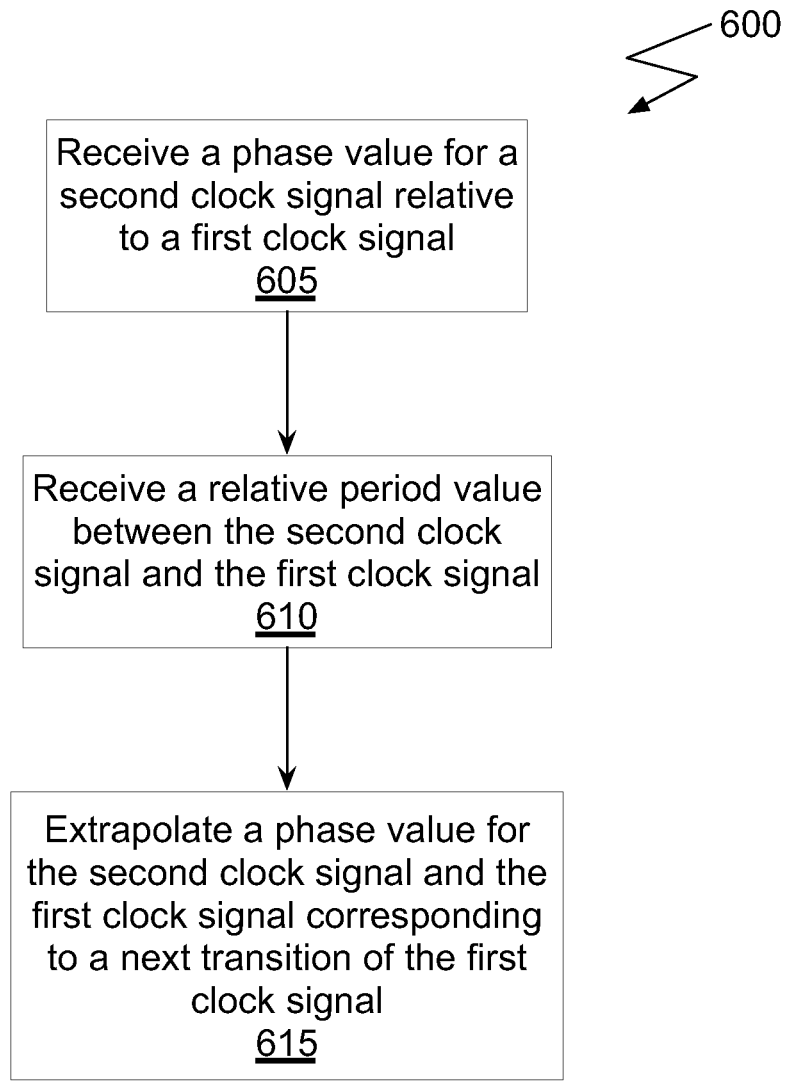
FIG. 6B illustrates a flowchart of a method for synchronizing signals, in accordance with one embodiment.

FIG. 6B illustrates a flowchart of a method 600 for synchronizing signals, in accordance with one embodiment. At step 605 a phase value representing a phase of a second clock signal relative to a first clock signal is received by the variation-tolerant synchronizer. At step 610 a period value representing a relative period between the second clock signal and the first clock signal is received by the variation-tolerant synchronizer. At step 615 an extrapolated phase value of the second clock signal relative to the first clock signal corresponding to a next transition of the first clock signal is computed based on the phase value and the period value.

More illustrative information will now be set forth regarding various optional architectures and features of a variant tolerant synchronizer. It should be strongly noted that the following information is set forth for illustrative purposes and should not be construed as limiting in any manner. Any of the following features may be optionally incorporated with or without the exclusion of other features described.

Given the phase 203 (phase) value and the period 204 (period) value, extrapolated phase values may be computed as:

$p_i$=phase+$S-i$*period for i=[0,X] and S in UI. Where X is selected to ensure at least one extrapolated phase value is greater than one. Greater than one means that the extrapolated phase value occurs after the current edge of the Clk 201, i.e., in the future. Each extrapolated phase value $p_i$ is the time from transition i of the Clk 202 to the next transition of the Clk 201.

Figure 6C:
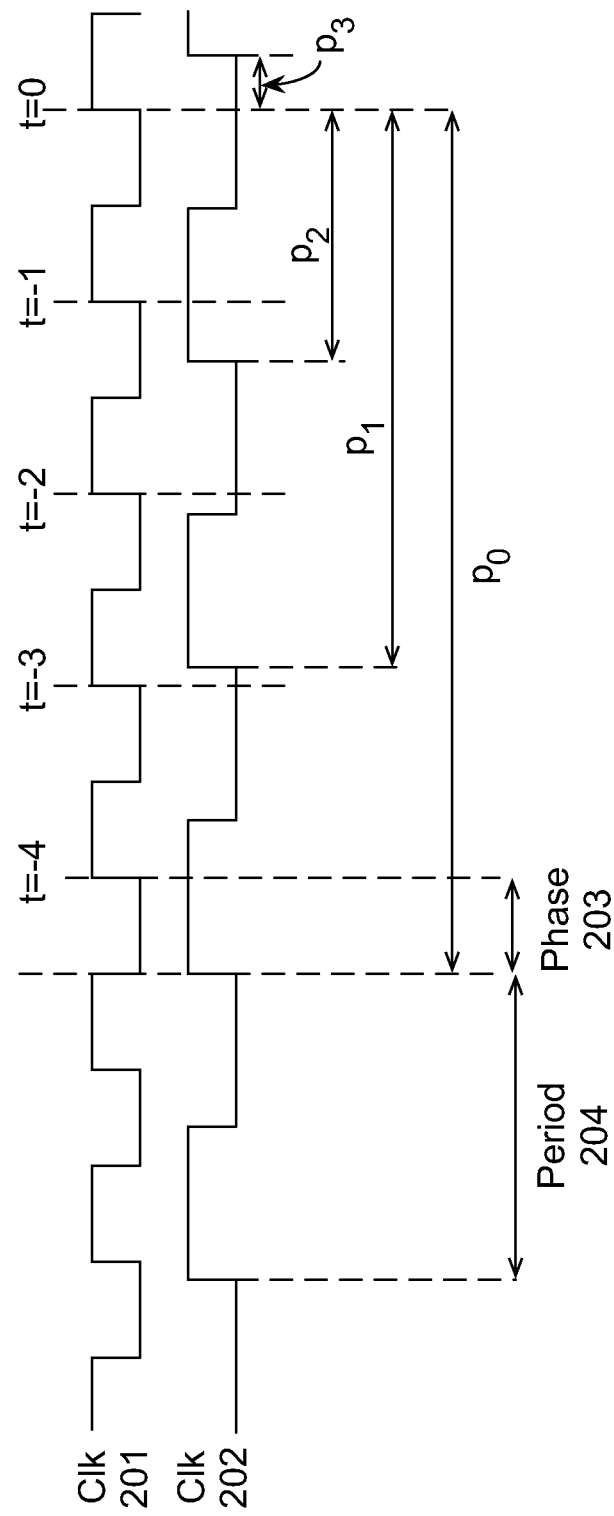
FIG. 6C illustrates waveforms of two clock signals, in accordance with one embodiment.

FIG. 6C illustrates waveforms of two clock signals, the Clk 201 and the Clk 202, in accordance with one embodiment. In the example shown in FIG. 6C, the frequency of the Clk 201 is 1 GHz (1000 ps period) and the frequency of the Clk 202 is 621 MHz (1610 ps period). The phase 203 value is an 8 (four bits to the right of the binary point, phase=0.5). The phase 203 value is associated with an even edge indication. The period 204 value is 26 (1.61 in fixed-point format with four bits to the right of the binary point). The phase 203 and period 204 values reflect the state of the Clk 202 D=3 cycles of the Clk 201 in the past, so S=4.

As shown in FIG. 6C, the phase 203 value that is received at time t=0 corresponds to the state of the Clk 201 and the Clk 202 at time t=−4, four cycles of the Clk 201 earlier than time t=0. At time t=0, the variation tolerant synchronizer selects either the even or odd register to sample the signals to be synchronized. As previously explained, the variation tolerant synchronizer first computes extrapolated phase values to generate a series of extrapolated phases based on the phase 203 value and the period 204 value.

At time t=−4 a rising edge of the Clk 202 occurred in the middle of the receiver eye of the Clk 201, i.e., halfway between two rising edges of the Clk 201. Assuming that the high-resolution phase detector 200 or 500 includes N=16 delay elements 211 or 511, respectively, the period 203 value is 26 measured in units of $1/16^{th}$ of the period of the Clk 201 or $1/16$ UI. S in units of $1/16$ UI is 4*N, so S=64/16 UI. The variation tolerant synchronizer then computes a series of extrapolated phase values $p_i$ in units of $1/16$ UI as:

$$p_0=8+64=-72 \text{ (even)}$$

$$p_1=8+64-26=-46 \text{ (odd)}$$

$$p_2=8+64-2*26=-20 \text{ (even)}$$

$$p_3=8+64-3*26=6 \text{ (odd)}$$

$$p_4=8+64-4*26=32 \text{ (even)}$$

The variation tolerant synchronizer searches the series of extrapolated phase values to find the two extrapolated phase values that straddle the transition of the Clk 201 at time t=0. The two extrapolated phase values that straddle time t=0 provide the timing of the two transitions of the Clk 202 that are closest to the next transition of the Clk 201 occurring at t=0. One of the transitions of the Clk 202 is an even edge and the other is an odd edge. To ensure the largest possible timing margin, the variation tolerant synchronizer may be configured to select the extrapolated phase value having the larger margin. Alternatively to minimize latency, the synchronizer can be configured to select the smallest negative extrapolated phase value providing adequate margin for safe sampling of input signals in the clock domain associated with the Clk 202. The smallest negative phase value is the latest extrapolated phase value that is closest to the next transition of the Clk 201.

As shown in FIG. 6C, the two extrapolated phase values that straddle the edge of the Clk 201 at t=0 are $p_2=-20$ (even) and $p_3=6$ (odd). In other words, an even edge of the Clk 202 occurs 20/16 of a Clk 201 cycle before the next edge of the Clk 201 (at time t=0) and an odd edge of the Clk 202 occurs 6/16 of a Clk 201 cycle after the next edge of Clk 201. The variation tolerant synchronizer is configured to identify the extrapolated phase value $p_2=-20$ as the safe extrapolated phase value and select the "even" register corresponding to the extrapolated phase value $p_2$. Selecting the extrapolated phase value $p_2$ provides 20/16 of a Clk 201 cycle, i.e., 1375 ps of timing margin. In one embodiment, to reduce latency, the minimum timing margin is added to each extrapolated phase and the variation tolerant synchronizer is configured to select the negative extrapolated phase value closest to t=0.

If the period of the Clk 201 and/or the Clk 202 varies smoothly during a voltage transient, accuracy of the extrapolated phase values may be improved by adding a second order term to the extrapolated phase value equation. The second order term accounts for the slope of a sequence of period 204 values. Whenever the period 204 value is updated, a difference value for each consecutive period 204 value, dperiod, may be computed:

$$d\text{period}=\text{new\_period}-\text{old\_period}.$$

The equation to compute extrapolated phase values using the second order term is:

$$p_i=\text{phase}+S-i*\text{period}-i^2*d\text{period}$$

However, because the period 204 values reflect the state of the Clk 201 and the Clk 202 in the past, the value of dperiod also lags and the extrapolated phase values will also lag and not account for the changing period for D cycles of the Clk 201.

Figure 6D:
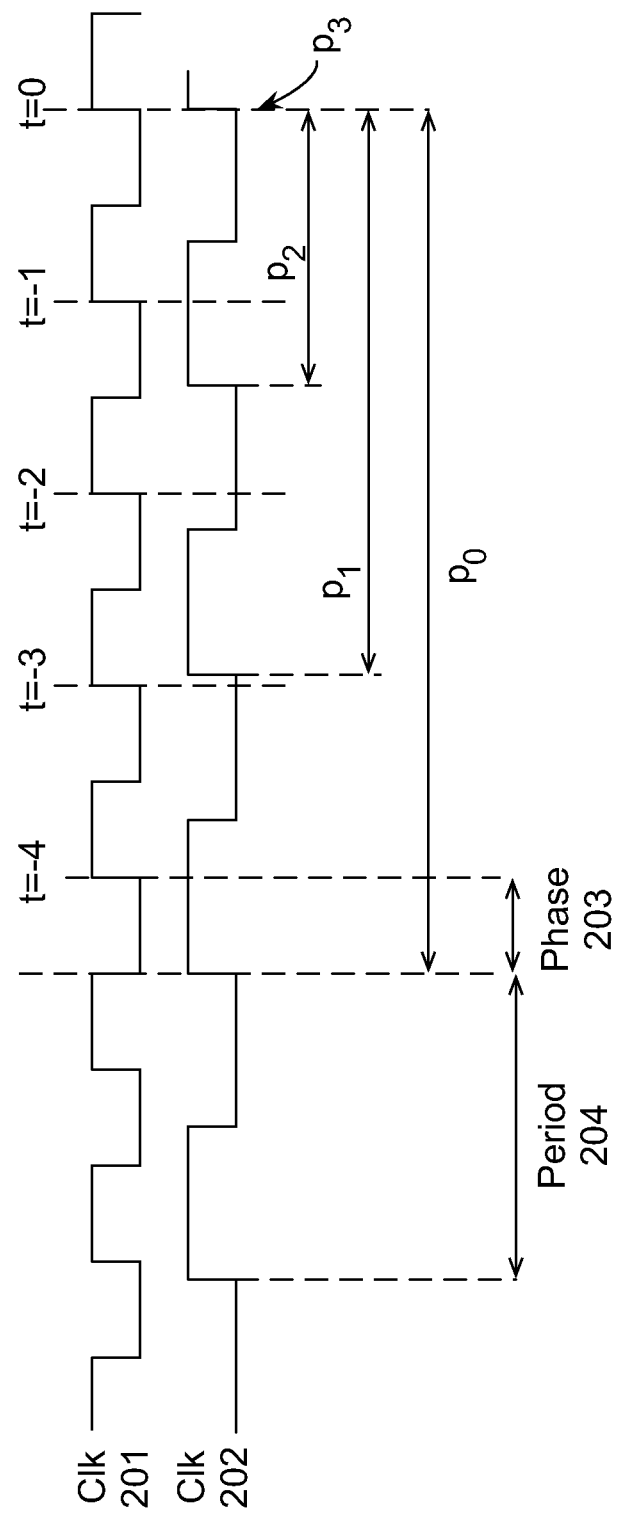
FIG. 6D illustrates other waveforms of two clock signals, in accordance with one embodiment.

FIG. 6D illustrates other waveforms of the two clock signals, Clk 201 and Clk 202, in accordance with one embodiment. At time t=−4 a rising edge of the Clk 202 occurred in the middle of the receiver eye of the Clk 201, i.e., halfway between two rising edges of the Clk 201. Assuming that the high-resolution phase detector 200 or 500 includes 16 delay elements 211, the period 203 value is 26/16 and dperiod is computed as −2/3. The variation tolerant synchronizer then computes a series of extrapolated phase values $p_i$ in units of $1/16$th of the period of the Clk 201 as:

$$p_0=8+64=-72 \text{ (even)}$$

$$p_1=8+64-26+(2/3)=-47 \text{ (odd)}$$

$$p_2=8+64-2*26+4*(2/3)=-22\tfrac{2}{3} \text{ (even)}$$

$$p_3=8+64-3*26+9*(2/3)=0 \text{ (odd)}$$

$$p_4=8+64-4*26+16*(2/3)=21\tfrac{1}{3} \text{ (even)}$$

The variation tolerant synchronizer searches the series of extrapolated phase values to find the two extrapolated phase values that straddle the transition of the Clk 201 at time t=0. The two extrapolated phase values that straddle time t=0 provide the timing of the two transitions of the Clk 202 that are closest to the next transition of the Clk 201. One of the transitions of the Clk 202 is an even edge and the other is an odd edge. To ensure the largest possible timing margin, the variation tolerant synchronizer may be configured to select the extrapolated phase value having the larger margin. Alternatively the variation tolerant synchronizer may be configured to select the smallest negative phase value with a safe margin.

As shown in FIG. 6D, the two extrapolated phase values that straddle the edge of the Clk 201 at t=0 are $p_2=-22\tfrac{2}{3}$ (even) and $p_3=0$ (odd). The variation tolerant synchronizer is configured to identify the extrapolated phase $p_2=-22\tfrac{2}{3}$ as the safe extrapolated phase value and select the "even" register corresponding to the extrapolated phase $p_2$. The extrapolated phase $p_3=0$ should not be selected because the timing margin is 0 and the edges of the Clk 201 and the Clk 202 may be coincident.

The worst-case timing in terms of selecting a safe extrapolated phase value occurs when the even and odd extrapolated phase values are equidistant from t=0 (the current transition of the Clk 201) because the timing margin is half of the period of the Clk 201, $T_r/2$. The timing margin needs to accommodate the errors in the measured phase 203 and period 204 values. Errors in measurement of the phase 203 value include quantization errors of ½ LSB (1/32 of the period of the Clk 201 the previous example) plus any systematic error in the high-resolution phase detector 200 or 500. Errors in measurement of the period 204 value include quantization plus systematic error multiplied by i. The maximum value of i is $Sf_t/f_r$, where $f_t$ and $f_r$ are the frequencies of the Clk 202 and the Clk 201, respectively. The timing margin also needs to accommodate errors due to variations of the periods of the Clk 201 and/or the Clk 202 due to voltage transients integrated over i cycles.

For example, suppose that the measurement error of the phase 203 value and the period 204 value are limited to 1/32 of the period of the Clk 201 (31 ps), that the period of the Clk 202 is at least 1000 ps, that $i_{max}$=6, and that the keepout region is 50 ps wide. The keepout region is a threshold of time on either side of an edge of the Clk 201 during which an extrapolated phase value is not considered safe. The measurement error is a total of 7*31 ps=217 ps. When the measurement error and the keepout region are subtracted from the period of the Clk 202, 1000 ps−217 ps=733 ps remain within which to tolerate a period variation over 6 cycles. 733 ps over 6 cycles averages to over 120 ps/cycle, or assuming a linear variation, a sweep from 0ps/cycle at the start of the interval to 240 ps/cycle at the end of the interval.

If needed, the timing margin may be increased by using more registers in the synchronizer. For example, rather than dividing edges into even and odd, three registers may be used labeling edges as first, second, and third. Using three separate registers provides a full cycle of the Clk 202 as timing margin. Using two registers gives a timing margin of ½ of a Clk 202 period. Using three registers gives a timing margin of one Clk 202 period and using four registers gives a timing margin of two Clk 202 periods. The extrapolated phase value that is closest to the current edge of the Clk 201 edge is the latest extrapolated phase value and when the latest extrapolated phase value meets the timing margin requirement it is considered to be the safe extrapolated phase value. The register corresponding to the safe extrapolated phase value is selected to generate the synchronized signals.

Figure 7A:
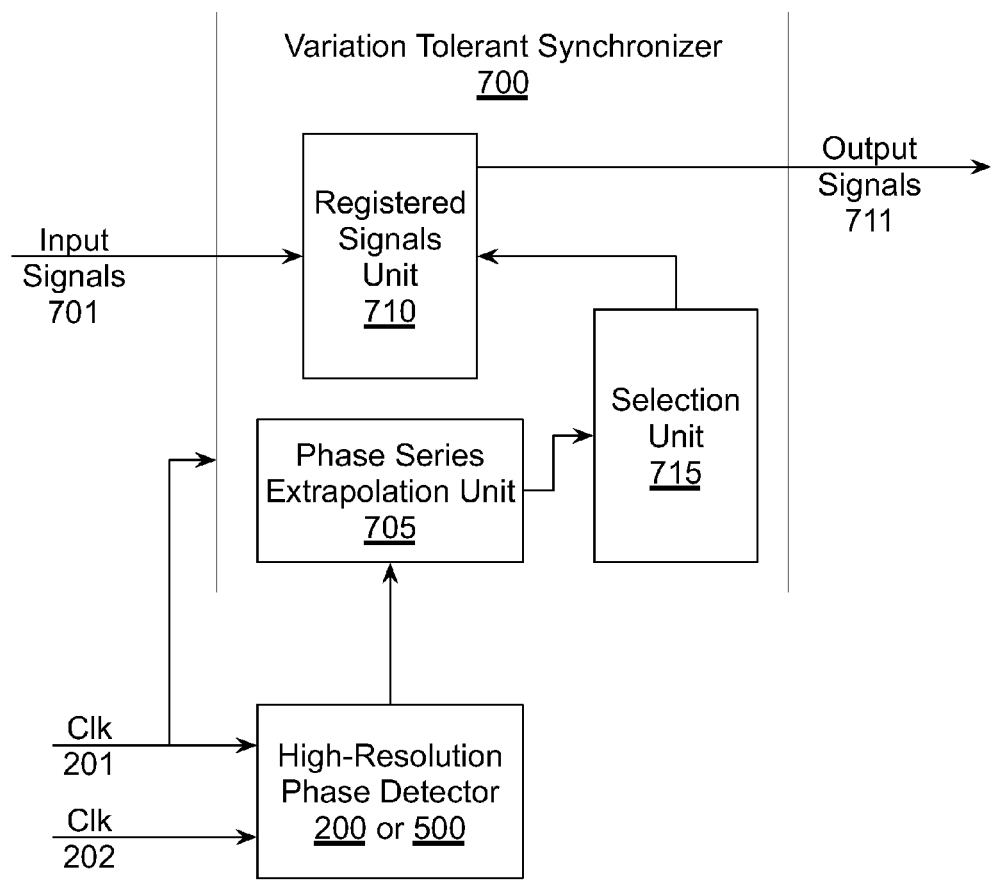
FIG. 7A illustrates a variation-tolerant periodic synchronizer, in accordance with one embodiment.

FIG. 7A illustrates a variation-tolerant periodic synchronizer 700, in accordance with one embodiment. The variation tolerant synchronizer 700 includes a registered signals unit 710, a phase series extrapolation unit 705, and a selection unit 715. A high-resolution phase detector 200 or 500 may be coupled to the variation tolerant synchronizer 700 to provide the phase 203 value and the period 204 value. The variation-tolerant periodic synchronizer 700 receives the input signals 701 that are synchronized to the Clk 202, the Clk 201, the Clk 202, the phase 203 value, and the period 204 value and produces the output signals 711 that are synchronized to the Clk 201.

The registered signals unit 710 receives the input signals 701 that are synchronized to the Clk 202, samples the input signals 701 at different cycles of the Clk 202 (odd/even or first/second/third edges, etc.) and stores the sampled input signals for the different cycles of the Clk 202 in separate registers. The phase series extrapolation unit 705 receives the phase 203 and period 204 values and computes a series of extrapolated phase values that are provided to the selection unit 715. The selection unit 715 identifies a safe extrapolated phase value of the series of extrapolated phase values that is closest to the current transition of the Clk 201 while providing adequate timing margin.

If a safe extrapolated phase value cannot be found, the selection unit 715 indicates that no safe extrapolated phase value was found by negating an enable signal and updating of the output signals 711 is disabled for the current cycle of the Clk 201. When a safe extrapolated phase value is identified by the selection unit 715, the selection unit 715 configures the registered signals unit 710 to select the register corresponding to the safe extrapolated phase value to generate the output signals 711. When adequate timing margin exists for at least one of the extrapolated phase values, the enable signal should be enabled so that one of the separately registered versions of the input signals 701 is selected for output as the synchronized output signals 711. In sum, the variation-tolerant periodic synchronizer 700 selects a sampled version of the input signals 701 that corresponds to the safe extrapolated phase value as the output signals 711 that are synchronized to the Clk 201.

Figure 7B:
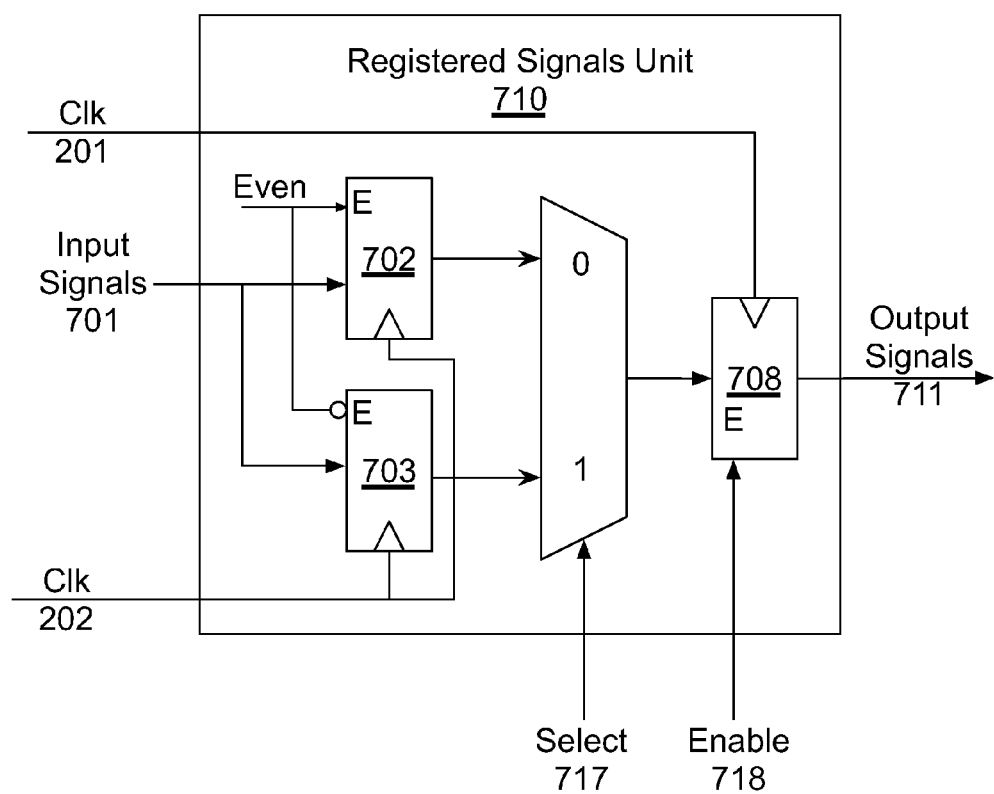
FIG. 7B illustrates the registered signals unit of FIG. 7A, in accordance with one embodiment.

FIG. 7B illustrates the registered signals unit 710 of FIG. 7A, in accordance with one embodiment. The registered signals unit 710 receives the input signals 701, the Clk 201, the Clk 202, a select 717, and an enable 718. The select 717 and enable 718 are generated by the selection unit 715 based on the series of extrapolated phase values. An even register 702 samples the input signals 701 at "even" transitions of the Clk 202 and an odd register 703 samples the input signals 701 at "odd" transitions of the Clk 202. The select 717 selects the output of either the even register 702 or the odd register 703. When the enable 718 is asserted, the selected output of registers 702 and 703 is sampled at the transition of the Clk 201 and output by a register 708 as the output signals 711. When the enable 718 is negated, the output signals 711 are maintained by the register 708 and not updated at the transition of the Clk 201.

Figure 7C:
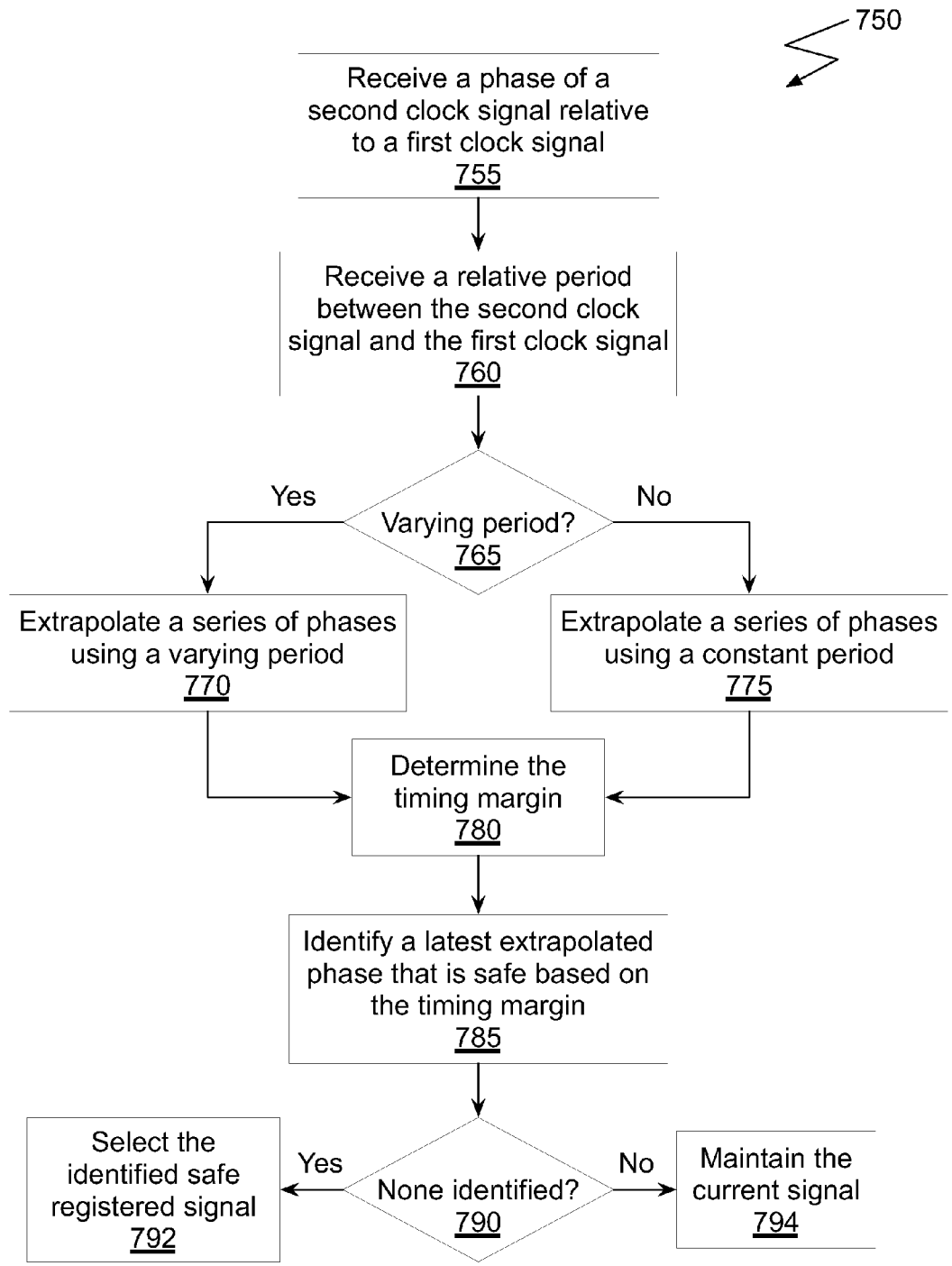
FIG. 7C illustrates another flowchart of a method for synchronizing signals, in accordance with one embodiment.

FIG. 7C illustrates another flowchart of a method 750 for synchronizing signals, in accordance with one embodiment. At step 755, a phase 203 value representing a phase of a second clock signal, e.g., the Clk 202, relative to a first clock signal, the Clk 201, is received by the variation-tolerant synchronizer 700. At step 760, a period 204 value representing a relative period between the second clock signal and the first clock signal is received by the variation-tolerant synchronizer 700. At step 765, the variation-tolerant synchronizer 700 determines if the period 204 value is varying, and, if so, a series of extrapolated phase values is computed using the phase 203 value, the period 204 value, and the varying period value, i.e., the slope of the period 204 value.

If at step 765, the variation-tolerant synchronizer 700 determines that the period 204 value is not varying, then, at step 775, a series of extrapolated phase values corresponding to a next transition of the first clock signal is computed based on the phase 203 value and the period 204 value. Note that for step 775 the slope of the period 204 value is zero, so steps 770 and 775 may be combined in one embodiment. At step 780, the variation-tolerant synchronizer 700 determines a timing margin based on the measurement error of the phase 203 value and the period 204 value and errors due to variations of the period 204 value due to voltage and/or current transients.

At step 785, at a transition of the first clock, the variation-tolerant synchronizer 700 identifies a latest extrapolated phase value in the series of extrapolated phase values that is also a safe extrapolated phase value based on the timing margin. When the extrapolated phase value that is closest to the next transition of the Clk 201 does not satisfy the timing margin, a next latest extrapolated phase value that satisfies the timing margin may be selected as the safe extrapolated phase value. At step 790, the variation-tolerant synchronizer 700 determines if a safe extrapolated phase value is identified, and, if not, at step 794, the variation-tolerant synchronizer 700 maintains the current output signals 711. Otherwise, at step 792, the variation-tolerant synchronizer 700 selects the signals output by the register corresponding to the safe extrapolated phase value to generate the output signals 711.

A Speculative Periodic Synchronizer

When the timing margin is applied, each extrapolated phase value becomes an extrapolated phase value interval or range, e.g., $[p_{i-}, p_{i+}]$, rather than a single value $p_i$. As the timing margins increase, the size of the extrapolated phase value intervals also increase and it may become more difficult to identify a safe extrapolated phase value for the next edge of the Clk 201. The latest extrapolated phase value interval may include the next transition of the Clk 201. The next latest extrapolated phase value interval may also include the next transition of the Clk 201. If a safe extrapolated phase value interval can be identified, the latency associated with the identified safe extrapolated phase value interval may be several cycles greater than the latency associated with the latest extrapolated phase value interval.

Figure 8A:
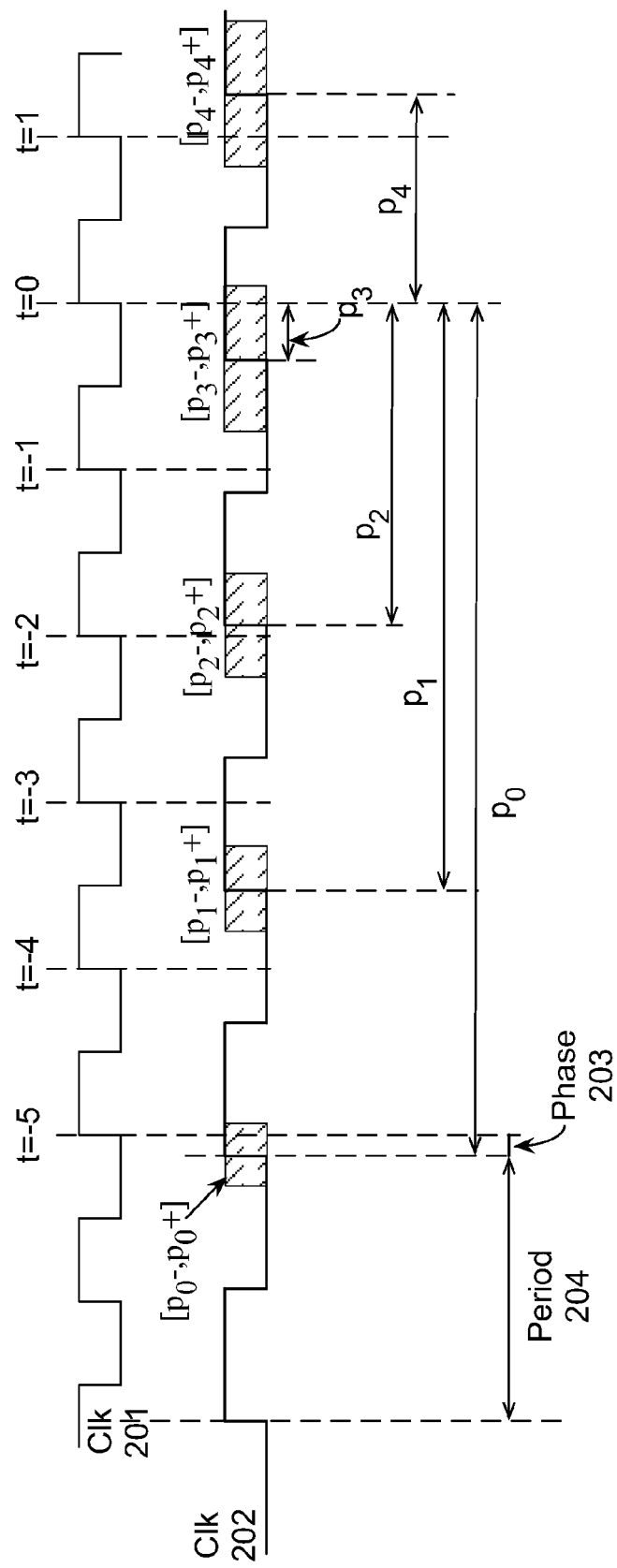
FIG. 8A illustrates waveforms of two clock signals and a series of extrapolated phase intervals, in accordance with one embodiment.

FIG. 8A illustrates waveforms of two clock signals, the Clk 201 and the Clk 202, and a series of extrapolated phase intervals $[p_i-,p_i+]$, in accordance with one embodiment. As i increases, the timing margin also increases, so that the range of each successive extrapolated phase value interval increases from $p_0$ to $p_4$. As shown in FIG. 8A, the pair of extrapolated phase values $p_3$ and $p_4$ straddle the next transition of the Clk 201 at t=0 and the extrapolated phase value $p_3$ is the latest extrapolated phase value. However, the extrapolated phase value interval $[p_3-,p_3+]$ for $p_3$ includes t=0. Therefore, the registered signal corresponding to the extrapolated phase value $p_3$ is not a safe extrapolated phase value because adequate timing margin is not provided. If t=0 were not included within the extrapolated phase value interval $[p_3-,p_3+]$ the extrapolated phase value $p_3$ would be a safe extrapolated phase value. For the example shown in FIG. 8A, the extrapolated phase value $p_2$ is the safe extrapolated phase value. The latency of a variation-tolerant synchronizer increases when the "older" registered signal corresponding to the extrapolated phase value $p_2$ is selected instead of the latest registered signal corresponding to the extrapolated phase value $p_3$.

As previously explained, the timing margin may be reduced by increasing the number of registers that sample the input signals for different transitions of the Clk 202. When the range of the extrapolated phase value intervals is very large the number of registers that sample the input signals may need to be increased to find an extrapolated phase value that is safe. Reducing the timing margin and range of the extrapolated phase value intervals reduces the latency of the variation-tolerant synchronizer. For example, a third register may be included in the registered signals unit 710 shown in FIG. 7B so that instead of sampling on even and odd cycles of the Clk 202, the input signals 701 are sampled every first, second, and third cycles of the Clk 202. Another technique that may be used to perform low-latency synchronization is to use a reduced timing margin, and speculatively synchronize the input signals using reduced extrapolated phase value intervals.

When operating speculatively, a speculative periodic synchronizer operates using reduced timing margins that are adequate to handle some, but not all, variation of clock periods of the Clk 201 and/or the Clk 202. For example, the reduced timing margins may be adequate to handle timing variation during normal operation but not sufficient to handle rare cases of extreme power supply variation that produce extreme variations in the clock periods of the Clk 201 and/or the Clk 202. The reduced timing margins cause the speculative periodic synchronizer to select sampled input signals having lower latency compared with a periodic synchronizer using non-reduced timing margins. However, because the reduced timing margins are speculative, the speculative periodic synchronizer checks each synchronization S cycles of the Clk 202 later, when the measured phase value is more precisely known. When the measured phase value differs from the extrapolated phase value such that the actual phase value does not satisfy the timing margin, i.e., is not safe, the synchronization resulting from the extrapolated phase value is recalled or cancelled. In one embodiment, any intervening synchronizations are also recalled. In an alternate embodiment, only the unsafe synchronization is recalled. Therefore, use of the speculative periodic synchronizer is limited to cases where the output signals generated by the speculative synchronization can be recalled several cycles after the output signals are generated. For example, when the result of speculative synchronizations initiates memory read operations the operations can be cancelled or the result of the read simply ignored and no persistent state is modified. However, the result of a speculative synchronization should not be used to initiate a memory write operation which may irreversibly modify persistent state.

Figure 8B:
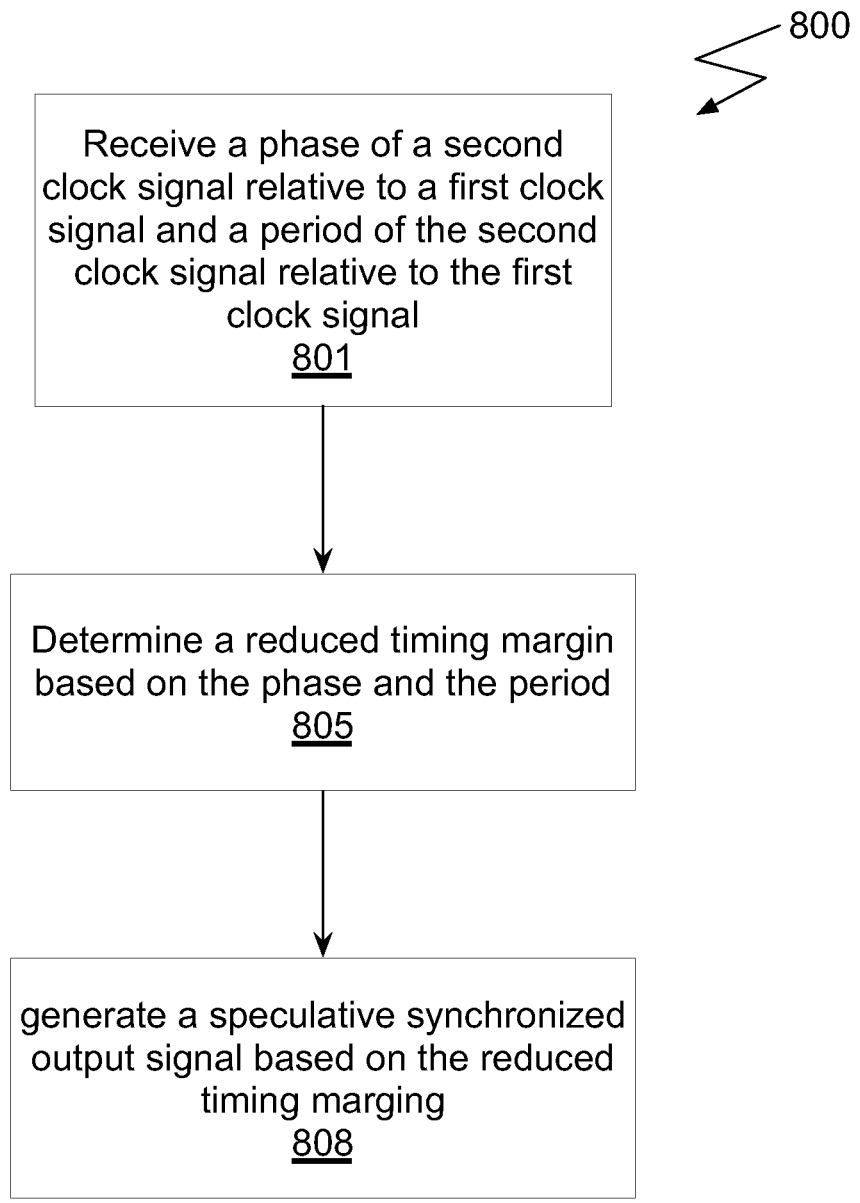
FIG. 8B illustrates a flowchart of a method for speculatively synchronizing signals, in accordance with one embodiment.

FIG. 8B illustrates a flowchart of a method 800 for speculatively synchronizing signals, in accordance with one embodiment. At step 801, a phase of a second clock signal relative to a first clock signal is received that was measured at least one cycle of the second clock signal earlier. At step 801, a period of the second clock signal relative to the first clock signal is received that was also measured at least one cycle of the second clock signal earlier. At step 805, reduced timing margin is determined based on the phase and the period. At step 808, a speculative synchronized output signal is generated based on the reduced timing margin. In one embodiment, a registered input signal is selected based on the reduced timing margin to generate the speculative synchronized output signal.

More illustrative information will now be set forth regarding various optional architectures and features of a speculative periodic synchronizer. It should be strongly noted that the following information is set forth for illustrative purposes and should not be construed as limiting in any manner. Any of the following features may be optionally incorporated with or without the exclusion of other features described.

The phase and the period values are measured for each transition of the Clk 202 and are updated at each cycle of the Clk 201. Retiming and synchronization within the high-resolution phase detector 200 and/or 500 introduce an S cycle delay in the availability of the measured phase 203 (503) and the period 204 (504) values that are output by the high-resolution phase detector 200 (500). The delayed measurements of the phase 203 and period 204 values (from S cycles in the past) produces the series of extrapolated phase values that are predicted phases of the Clk 202 relative to the next transition of the Clk 201. In one embodiment, a derivative of the measured period 204 values may also be used to produce the series of extrapolated phase values.

When timing margins are applied to the series of extrapolated phase values, each $p_i$ is bounded by a lower extrapolated phase interval bound $p_i-$ and an upper extrapolated phase interval bound $p_i+$:

$$p_i \in [p_i-,p_i+]=[\theta-\Delta\theta+S-iT-0.5(i^2+i)\Delta T, \theta+\Delta\theta+S-iT+0.5(i^2+i)\Delta T],$$

where $\theta$ is the phase 203 value and T is the period 204 value. The timing margins account for measurement uncertainty and variations in the period 204 value. A $\Delta\theta$ variation is the uncertainty in the measured phase value. The $\Delta T$ variation has two separate components, a systematic component $\Delta T_S$ and a measurement component $\Delta T_M$, such that $\Delta T=\Delta T_S+\Delta T_M$. $\Delta T_S$ is the variation in the period value due to a variation in the period of the Clk 201 and/or the Clk 202 and $\Delta T_M$ is the uncertainty of the measured period value.

When two registers are used to sample the input signals (odd/even), the series of extrapolated phase value intervals is searched to find the pair of extrapolated phase value intervals spaced by two that straddles t=0. In other words, the series of extrapolated phase value intervals is searched to find the largest i that satisfies the following constraint $$p_i+<0<p_{i+2}-.$$

The largest i that satisfies the constraint corresponds to an even or odd clock cycle and the corresponding even or odd register is selected to generate the synchronized output signal. When three registers are used to sample the input signals (e.g., first/second/third), the series of extrapolated phase value intervals is searched to find the pair of extrapolated phase value intervals spaced by three that straddles t=0. When the number of registers that sample the input signals is increased, the span between the extrapolated phase value intervals being searched increases (e.g., with three registers i is paired with i+3), and identification of a pair of extrapolated phase value intervals that satisfies the constraint is more likely.

As previously explained, when one or more of the extrapolated phase value intervals resulting from $\Delta T$ and/or $\Delta \theta$ include the transition of the Clk 201 at t=0, it may not be possible to identify a pair of extrapolated phase value intervals that satisfies the constraint. When a pair of extrapolated phase value intervals is not identified that satisfies the constraint, the synchronized output signal is not updated and the latency incurred by synchronization effectively increases. Speculative synchronization may be used to reduce the latency incurred for synchronization during most of the clock cycles by using reduced timing margins. For the clock cycles when speculative synchronization cannot be used reliably, i.e., when the sampled input signal may be metastable, the speculatively synchronized signals may be recalled (or cancelled) and then synchronized based on non-reduced timing margins, as described further herein.

In the previous analysis the variation in period T is characterized as a slope $\Delta T$. Over the S cycle duration from when the period is measured to when the period is used to compute the series of extrapolated phase values, the period can change by a total of $S\Delta T$. An absolute bound $\delta T$ may be applied as the variation of T, allowing the entire $\delta T$ variation to take place in a single cycle. In this case, the formula for the lower extrapolated phase interval bound $p_i-$ and the upper extrapolated phase interval bound $p_i+$ becomes:

$$p_i \in [p_i-,p_i+] = [\theta-\Delta\theta+S-iT-i\delta T, \theta+\Delta\theta+S-iT+i\delta T].$$

A smaller value for $\Delta T$ or $\delta T$ may be used to compute a reduced timing margin that is applied to the series of extrapolated phase value intervals to generate the speculative series of extrapolated phase value intervals. The latest safe speculative extrapolated phase value interval is identified to generate a speculatively synchronized output signal and output signals that are speculatively synchronized are marked as being speculative. Downstream logic receiving the speculatively synchronized output signals should avoid performing irreversible operations that depend on the speculatively synchronized output signals. After the speculatively synchronized output signals are determined to be safe (and will not be recalled) irreversible operations may be performed using the speculatively synchronized output signals.

The actual (measured) phase value that is received as the phase value 203 S cycles later is compared with the earlier identified speculative extrapolated phase value interval to determine whether the earlier identified speculative extrapolated phase value interval was safe. If the synchronization is performed in cycle k, then on cycle k+S the high-resolution phase detector 200 or 500 outputs the measured phase as the phase 203 value, $\theta_k$ in cycle k. One cycle later, on cycle k+S+1, the high-resolution phase detector 200 or 500 outputs $\theta_{k+j}$. The synchronization in cycle k was safe $$\theta_k > \Delta\theta + t_m \text{ and } \theta_{k+1} > 1 \text{ or } \theta_{k+1} < 1-\Delta\theta - t_m.$$

where $t_m$=is the timing margin.

If after taking measurements $\theta_k$ and $\theta_{k+1}$ the synchronization is found to be safe a validate signal is sent to mark the speculatively synchronized output signals as non-speculative. On the other hand, if the synchronization is found to be unsafe, a recall signal is sent to recall the speculatively synchronized output signals. Depending on the structure of the speculative periodic synchronizer, non-speculatively synchronized output signals that are generated based on a series of extrapolated phase value intervals may then be generated with greater latency.

Figure 8C:
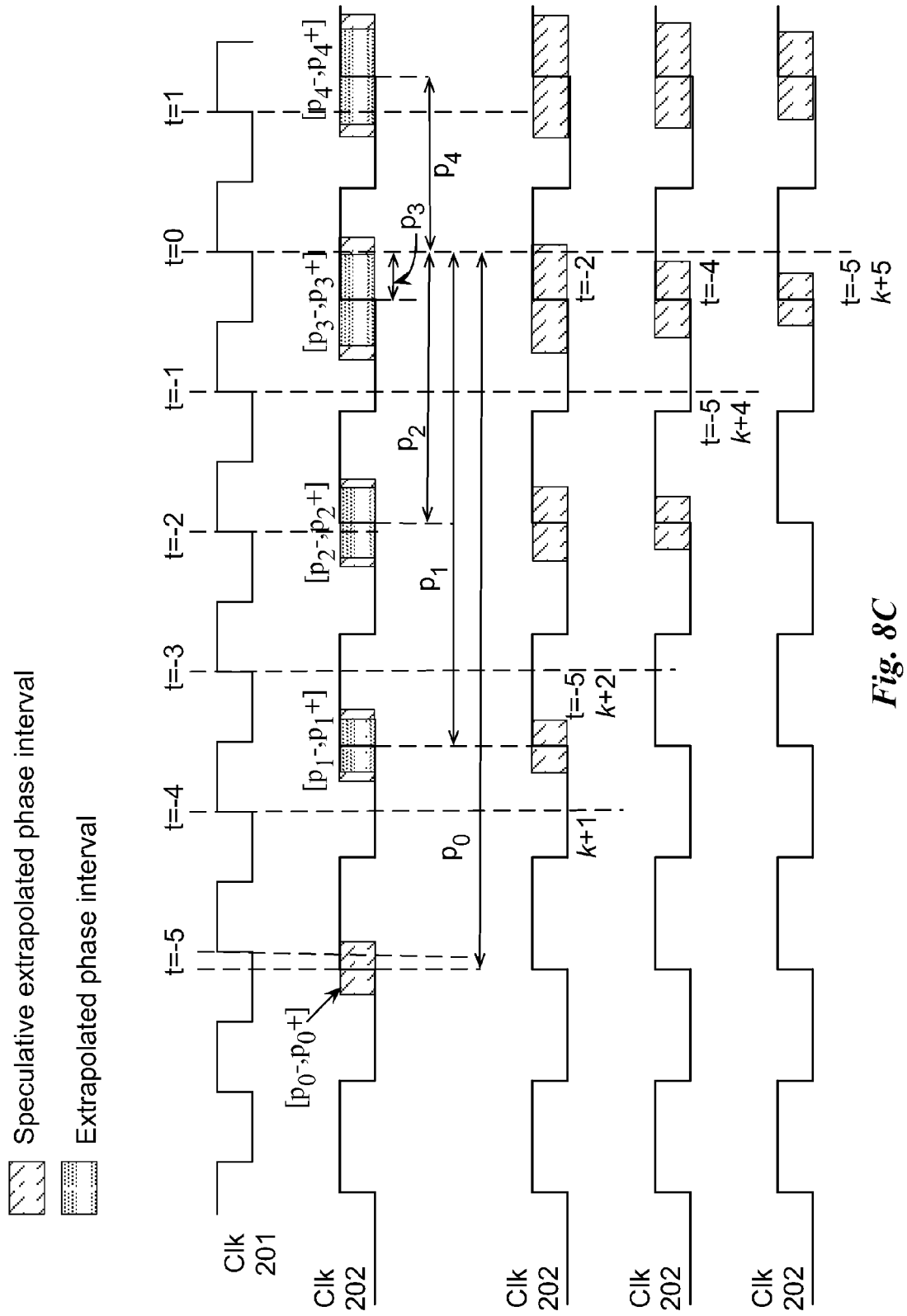
FIG. 8C illustrates waveforms of two clock signals and a speculative series of extrapolated phase intervals, in accordance with one embodiment.

In an alternate embodiment the synchronizer need not wait until cycle k+S to validate the speculative synchronization. Each cycle after the original synchronization for which a new phase measurement is available the full-margin phase interval associated with the synchronization is narrowed. FIG. 8C illustrates waveforms of the clock signals 201 and 202 and a speculative series of extrapolated phase intervals, in accordance with one embodiment. The speculative series of extrapolated phase intervals is generated using the series of extrapolated phase intervals shown in FIG. 8A and reduced timing margins. As shown in FIG. 8A, the phase value $p_2$ is the latest extrapolated phase value having an extrapolated phase value interval that does not include the transition of the Clk 202 at t=0. Therefore, the extrapolated phase value $p_2$ would be selected as the safe phase value. As shown in FIG. 8C, a reduced timing margin is applied and the extrapolated phase value interval $[p_3-, p_3+]$ shown in FIG. 8A is reduced to generate the speculative extrapolated phase value interval $[p_3-,p_3+]$ shown in FIG. 8C. As shown in FIG. 8C, the transition of the Clk 202 at t=0 occurs after and is not included within the speculative extrapolated phase value interval. Therefore, the extrapolated phase value $p_3$ is selected for the speculative synchronization.

After a cycle of the Clk 201 (at k+1), the measured phase value $p_1$ is not yet known because the rising edge of the Clk 202 occurs after t=−4. After another cycle of the Clk 201 (at k+2), the measured the phase value $p_1$ is known and the corresponding interval $[p_1-,p_1+]$ is narrowed such that $p_1-=p_1-\Delta\theta$ and $p_1+=p_1+\Delta\theta$ which equals the (non-speculative) extrapolated phase value interval for $p_1$. If the original synchronization had identified the phase $p_1$ as the phase value that was used for the speculative synchronization and the narrowed interval $[p_1-,p_1+]$ occurs before t=0 and does not include t=0 (now t=−2), then the synchronization may be marked non-speculative. However, $p_3$ was identified as the phase value for the speculative synchronization and the measured phase value $p_3$ is not yet known.

When the speculative extrapolated phase value interval for $p_1$ is narrowed to equal the extrapolated phase value interval for $p_1$, the other intervals in the series of extrapolated phase value intervals may also be updated and narrowed. Specifically, after two cycles of the Clk 201 have transpired at t=2 the extrapolated phase value interval of $p_3$ is computed using i=2 instead of i=3, as was used at t=0. If the updated interval $[p_3-,p_3+]$ occurs before and does not include t=0 (now t=−2), then the speculative synchronization may be marked non-speculative.

After four cycles of the Clk 201 have transpired at t=4 (k+4) and the extrapolated phase value interval of $p_3$ is computed using i=1 instead of i=3. If the updated interval

[p₃−,p₃+] does not include t=0 (now t=−4), as shown in FIG. 8C, then the speculative synchronization may be marked non-speculative. If the speculative synchronization could not be marked non-speculative at k+4, then, after five cycles of the Clk 201 the measured phase value $p_3$ taken at t=0 is known and the extrapolated phase value interval [$p_3$−,$p_3$+] is updated to [$p_3$−Δθ,$p_3$+Δθ]. If the updated interval occurred before and did include t=0 (now t=−5), then the speculative synchronization would be recalled. A speculative synchronization may be marked as non-speculative as soon as cycle k+1. A speculative synchronization may not be recalled until k=S.

Figure 8D:
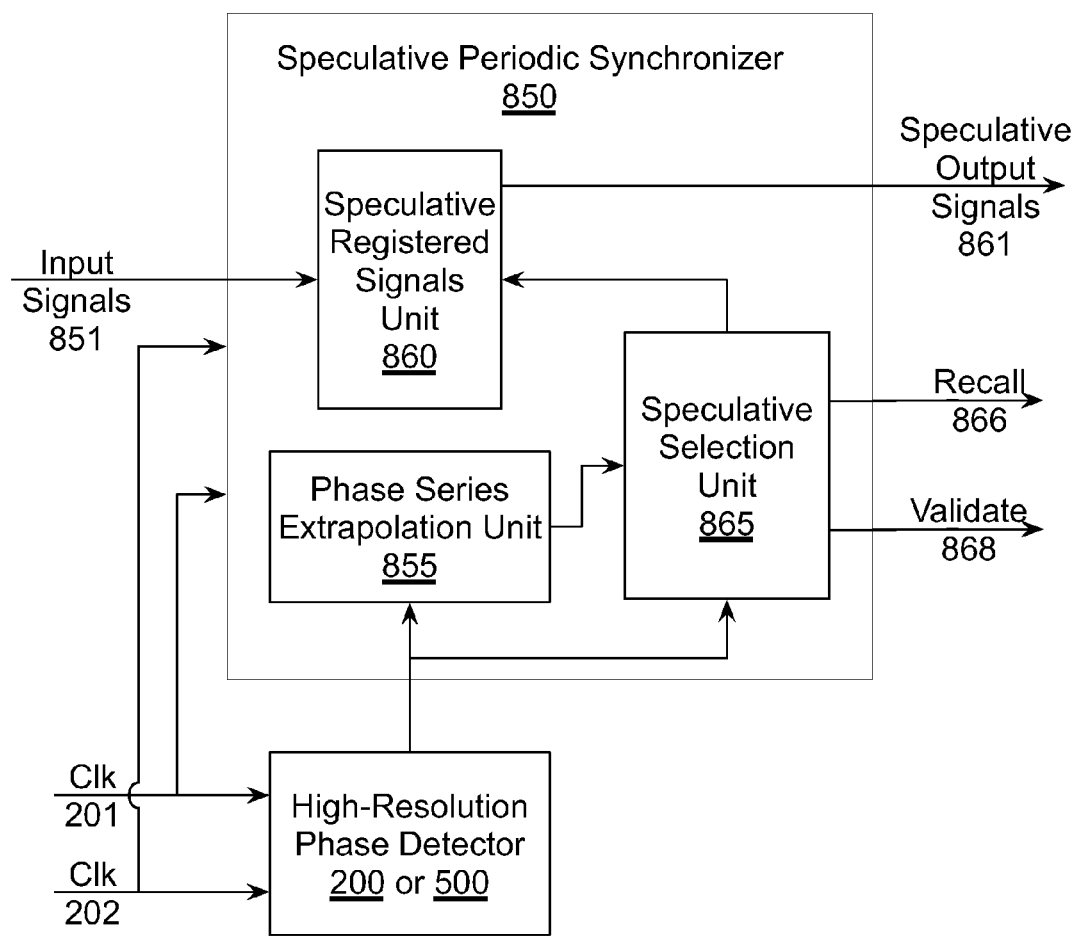
FIG. 8D illustrates a speculative periodic synchronizer, in accordance with one embodiment.

FIG. 8D illustrates a speculative periodic synchronizer 850, in accordance with one embodiment. The speculative periodic synchronizer 850 is coupled to a high-resolution phase detector 200 or 500 that generates the phase 203 value and the period 204 value. The speculative periodic synchronizer 850 includes a phase series extrapolation unit 855, a speculative registered signals unit 860, and a speculative selection unit 865. The phase series extrapolation unit 855 receives the phase 203 value and the period 204 value S cycles after the phase and period are measured and generates a series of extrapolated phase values. The speculative selection unit 865 receives the phase 203 value and the series of extrapolated phase values and applies a reduced timing margin to compute a speculative series of extrapolated phase value intervals, from which a latest speculative extrapolated phase value interval that does not include the Clk 201 transition at t=0 is identified. The speculative selection unit 865 selects the registered input signals 851 corresponding to the identified latest speculative extrapolated phase value interval to generate the speculatively synchronized output signals, speculative output signals 861. When the speculative selection unit 865 does not identify a speculative extrapolated phase value interval, the speculative output signals 861 are not updated. The speculative selection unit also produces an indication as to whether the output signal generated is speculative or not, e.g., a validate signal 868.

The speculative selection unit 865 tracks the speculative output signals 861 that are output and generates a recall signal 866 or a validate signal 868, as needed. The recall signal 866 is used to recall speculative output signals 861 that were previously output based on the corresponding measured phase 203 value that is received by the speculative selection unit 865 S cycles later. Recalled speculative output signals 861 are discarded by the receiving logic. The validate signal 868 is used to indicate that a previously speculative output signal has been determined to be non-speculative and hence can be safely used in an irreversible operation. The validate signal 868 may be asserted as late as S cycles after speculative output signals 861 are generated. The speculative registered signals unit 860 may include two or more registers, where each register is configured to sample the input signals 851 on a different transition of the Clk 202.

Figure 8E:
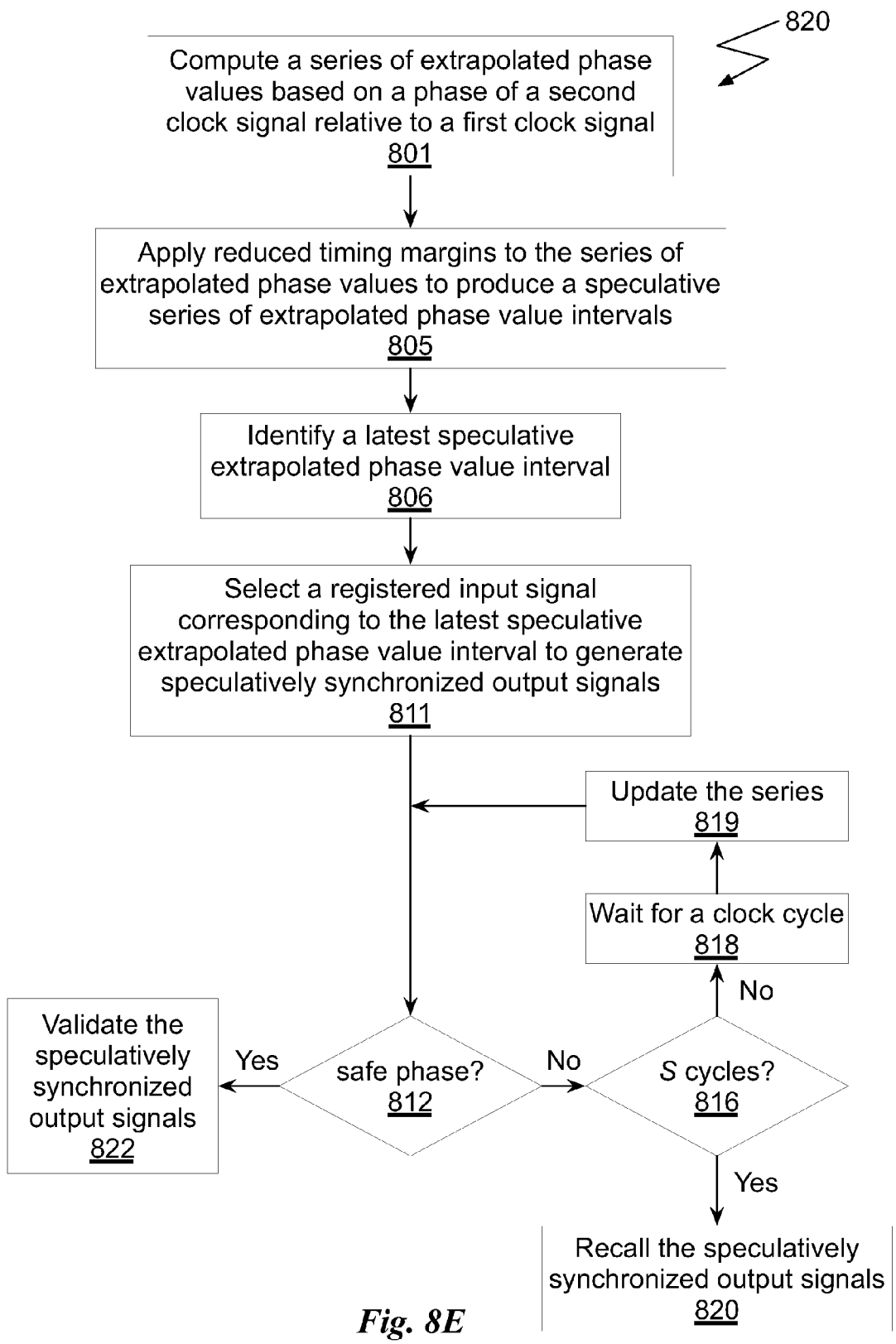
FIG. 8E illustrates another flowchart of a method for speculatively synchronizing signals, in accordance with one embodiment.

FIG. 8E illustrates another flowchart of a method 820 for speculatively synchronizing signals, in accordance with one embodiment. At step 801, the phase series extrapolation unit 855 computes a series of extrapolated phase values based on the phase 203 value and the period 204 value provided by the high-resolution phase detector 200 or 500. At step 805, the speculative selection unit 865 applies a reduced timing margin, e.g., a reduced variation in ΔT or δT to the series of extrapolated phase values to produce a speculative series of extrapolated phase value intervals. At step 806, the speculative selection unit 865 identifies a latest speculative extrapolated phase value interval that does not include a transition of the Clk 201 at t=0. At step 811, the speculative selection unit 865 configures the speculative registered signals unit 860 to select a registered input signal corresponding to the latest speculative extrapolated phase value interval to generate the speculative output signals 861. If the speculative output signals 861 are not speculative, i.e., an extrapolated phase value interval is safe without the reduced timing margins then the validate 868 signal is asserted.

If, at step 812, the speculative selection unit 865 determines that the latest speculative extrapolated phase value interval was safe, then at step 822, the validate 868 signal is asserted and synchronization of the input signals 851 continues. Otherwise, at step 816, the speculative selection unit 865 determines if S cycles of the Clk 201 have occurred since the speculative output signals 861 were generated, and, if so, at step 820, the speculative selection unit 865 recalls the speculative output signals 861 generated S cycles earlier.

Otherwise, at step 818, the speculative selection unit 865 waits for another cycle of the Clk 201 to possibly obtain a phase 203 value corresponding to an extrapolated phase value. At the next cycle of the Clk 201, the series of extrapolated phase value intervals is updated when a new phase 203 value is known. As previously explained in conjunction with FIG. 8C, updating the series of extrapolated phase value intervals when a new phase 203 is received narrows the phase value intervals. At step 812, the narrowed extrapolated phase value intervals are checked to see if the speculative synchronization can be marked as non-speculative. Note, that the speculative selection unit 865 may be configured to generate the speculative output signals 861 while simultaneously performing one or more of steps 812, 816, 818, 822, and 820.

In one embodiment, the speculative periodic synchronizer 850 may be configured to perform both an aggressive synchronization and a safe synchronization. The safe synchronization has a higher latency compared with the aggressive synchronization so that aggressively synchronized signals appear one or more cycles ahead of the signals that are safely synchronized. However, the latency incurred when a recall is needed is reduced because the safely synchronized signal can replace the recalled aggressively synchronized signals within a small number of clock cycles. Output signals that are aggressively synchronized are labeled as speculative and irreversible operations should not be performed using the speculative output signals until the output signals are marked as non-speculative (validated). When a safely synchronized output signal is available that corresponds to a previously output speculative output signal, the safely synchronized output signal is compared to the previously output speculative output signal. If the signals match, the speculative output signal is marked non-speculative and the safely synchronized output signal is discarded. If the signals do not match, then previously output speculative output signal is recalled and replaced by the safely synchronized output signal.

Replacing a recalled speculative output signal 811 may require re-doing reversible work that was done from the time the speculative output signal 811 was received from the speculative periodic synchronizer 850 until the safely synchronized output signal is received from the speculative periodic synchronizer 850. For example in a pipelined circuit that receives the speculative output signal 811, several pipeline stages may need to be flushed and the sequence of inputs, starting with the safely synchronized output signal, may need to be replayed.

Figure 9A:
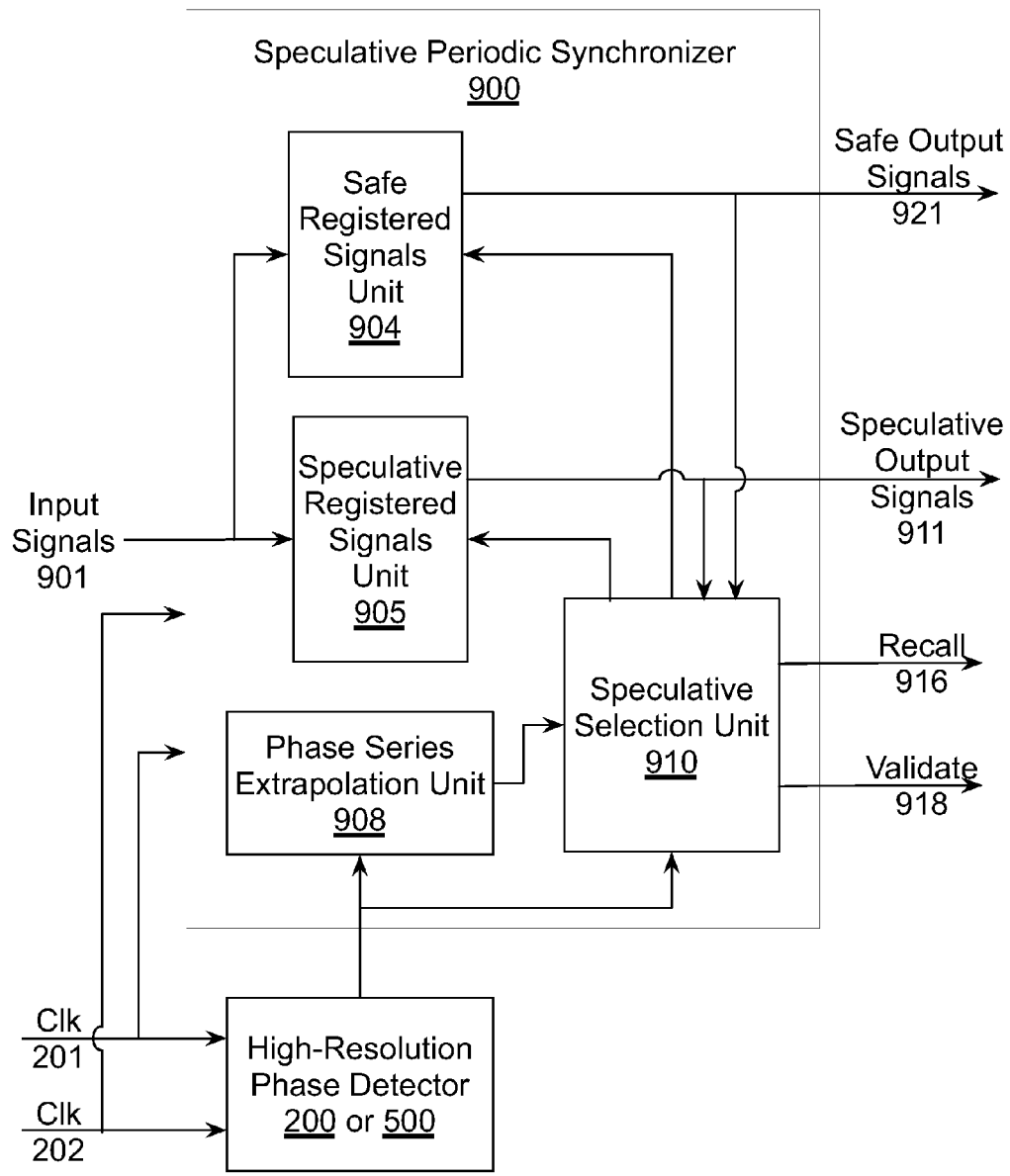
FIG. 9A illustrates another speculative periodic synchronizer, in accordance with one embodiment.

FIG. 9A illustrates a speculative periodic synchronizer 900, in accordance with one embodiment. The speculative periodic synchronizer 900 is coupled to a high-resolution phase detector 200 or 500 that generates the phase 203 value and the period 204 value. The speculative periodic synchronizer 900 includes a phase series extrapolation unit 908, a safe registered signals unit 904, a speculative registered signals unit 905, and a speculative selection unit 910. The phase series extrapolation unit 908 receives the phase 203 value and the period 204 value S cycles after the phase and period are measured and generates a series of extrapolated phase values. The speculative selection unit 910 receives the phase 203 value and the series of extrapolated phase values and applies a reduced timing margin to compute a speculative series of extrapolated phase value intervals, from which a latest speculative extrapolated phase value interval is identified that does not includes a transition of the Clk 201 at t=0. The speculative selection unit 910 configures the speculative registered signals unit 905 to select the registered input signals 901 corresponding to the identified latest speculative extrapolated phase value interval to generate the speculative output signals 911. When the speculative selection unit 910 does not identify a safe speculative extrapolated phase value interval, the speculative output signals 911 are not updated and the validate signal 928 is asserted.

The speculative selection unit 910 also applies a non-reduced timing margin to the series of extrapolated phase values to compute a safe series of extrapolated phase value intervals, from which a latest safe extrapolated phase value interval is identified. The speculative selection unit 910 configures the safe registered signals unit 904 to select the registered input signals 901 corresponding to the latest extrapolated phase value interval to generate the safe output signals 921. When the speculative selection unit 910 does not identify an extrapolated phase value interval, the safe output signals 921 are not updated.

The speculative selection unit 910 tracks the speculative output signals 911 that are output and generates a recall signal 906, as needed, to recall previously output speculative output signals 911 when the previously output speculative output signals 911 do not match the corresponding safe output signals 921 that are received by the speculative selection unit 910 one or more cycles later. Recalled speculative output signals 911 are replaced with the corresponding safe output signals 921 by the receiving logic. The validate signal 928 may be asserted up to S cycles after speculative output signals 911 are generated. The safe registered signals unit 904 and the speculative registered signals unit 905 may include two or more registers, where each register is configured to sample the input signals 901 on a different transition of the Clk 202. In one embodiment, at least a portion of the two or more registers is shared between the safe registered signals unit 904 and the speculative registered signals unit 905.

Figure 9B:
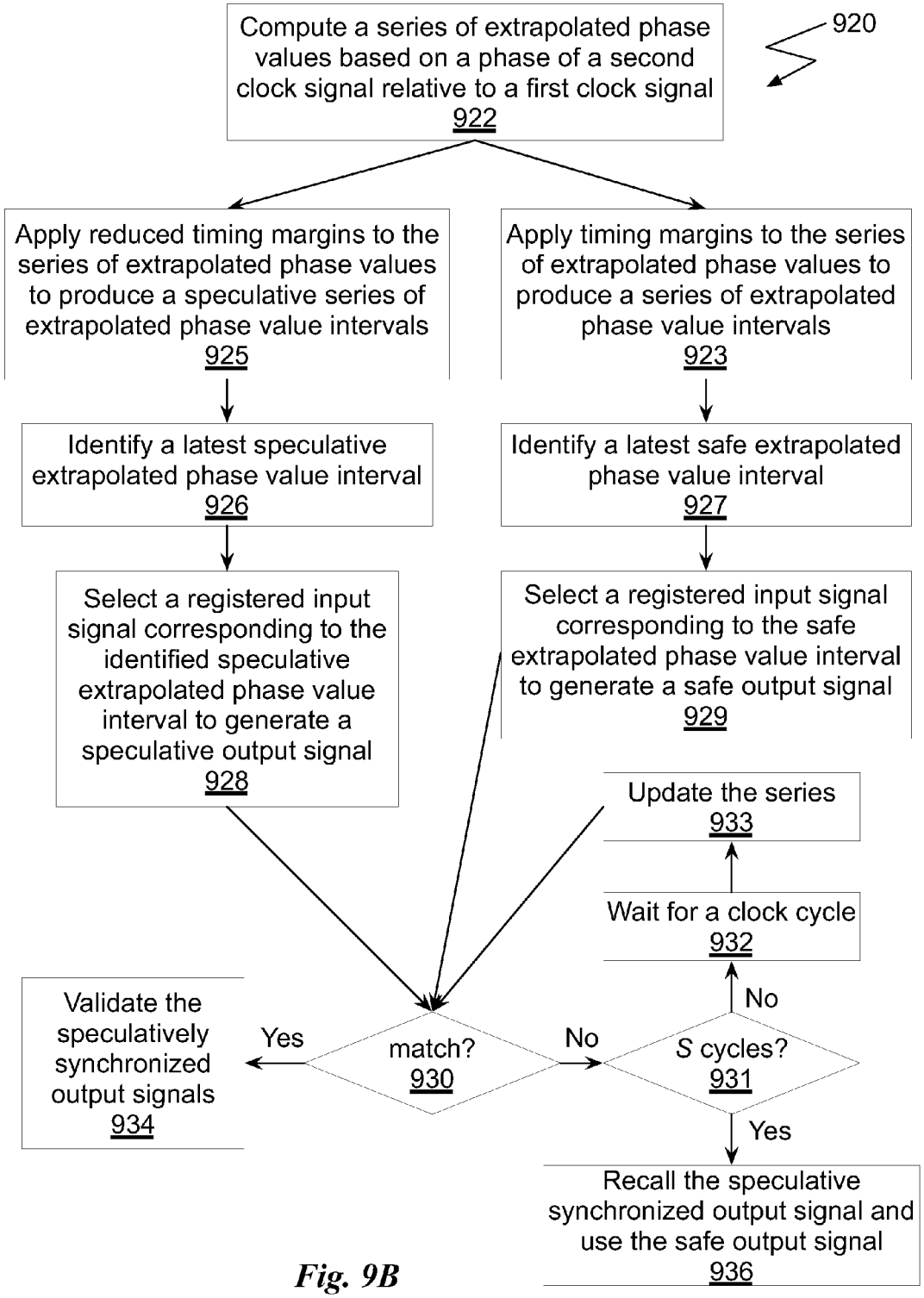
FIG. 9B illustrates another flowchart of a method for speculatively synchronizing signals, in accordance with one embodiment.

FIG. 9B illustrates a flowchart 920 of another method for speculatively synchronizing signals, in accordance with one embodiment. At step 922, the phase series extrapolation unit 908 computes a series of extrapolated phase values based on the phase 203 value and the period 204 value provided by the high-resolution phase detector 200 or 500. At step 925, the speculative selection unit 910 applies a reduced timing margin, e.g., a reduced variation in ΔT or δT to the series of extrapolated phase values to produce a speculative series of extrapolated phase value intervals. At step 926, the speculative selection unit 910 identifies a latest speculative extrapolated phase value interval. At step 928, the speculative selection unit 910 configures the speculative registered signals unit 905 to select a registered input signal corresponding to the identified latest speculative extrapolated phase value interval to generate speculative output signals 911.

At step 923, the speculative selection unit 910 applies a non-reduced timing margin to the series of extrapolated phase values to produce a (safe) series of extrapolated phase value intervals. At step 927, the speculative selection unit 910 identifies a latest safe extrapolated phase value interval. At step 929, the speculative selection unit 910 configures the safe registered signals unit 904 to select a registered input signal corresponding to the latest safe extrapolated phase value interval to generate safe output signals 921. One or more of steps 923, 927, and 929 may be performed in parallel or in series with steps 925, 926, and 928.

At step 930, the speculative selection unit 910 determines if the safe output signals 921 match the corresponding previously output speculative output signals 911. If, at step 930, the speculative selection unit 910 determines that the safe output signals 921 match the corresponding previously output speculative output signals 911, then the previously output speculative output signals 911 are safe, and, at step 934, the validate signal 918 is asserted and synchronization of the input signals 851 continues. In other words, the previously output speculative output signals 911 are marked as non-speculative. Otherwise, if the safe output signals 921 do not match the corresponding previously output speculative output signals 911 at step 931, the speculative selection unit 910 determines if S cycles of the Clk 201 have occurred since the speculative output signals 911 were generated, and, if so, at step 936, the speculative selection unit 910 recalls the speculative output signals 911 corresponding to the safe output signals 921 and the speculative output signals 911 are replaced with the safe output signals 921.

Otherwise, at step 932, the speculative selection unit 900 waits for another cycle of the Clk 201 to possibly obtain a phase 203 value corresponding to an extrapolated phase value. At the next cycle of the Clk 201, the series of extrapolated phase value intervals is updated when a new phase 203 value is known. As previously explained in conjunction with FIG. 8C, updating the series of extrapolated phase value intervals when a new phase 203 is received narrows the phase value intervals. At step 930, the narrowed extrapolated phase value intervals are compared with the corresponding previously output speculative output signals 911 to see if the speculative synchronization can be marked as non-speculative. Note, that the speculative selection unit 910 may be configured to output speculative output signals 911 while simultaneously performing one or more of steps 930, 931, 932, 934, and 936.

In a common use case, the speculative periodic synchronizer 950 may be used to pass first-in first-out (FIFO) buffer head and tail pointers between the clock domains associated with the Clk 201 and the Clk 202. In contrast with conventional synchronizers, the head and tail pointers do not need to be Gray-coded when the speculative periodic synchronizer 950 is used. Non-speculative or safely synchronized pointer values should be used to check for the FIFO full condition—to avoid overwrites. Speculatively synchronized pointer values may be used to check for FIFO empty conditions—to reduce latency. When the FIFO goes from the empty to the non-empty state, speculatively synchronized head and tail pointer values are generated by the speculative periodic synchronizer 950 with low latency. Safely synchronized head and tail pointer values are generated by the speculative periodic synchronizer 950 in the same cycle or one or more cycles later. Note that the speculative periodic synchronizer 950 is configured to provide both the speculatively synchronized head and tail pointer values and the safely synchronized head and tail pointer values, e.g., speculative output signals 911 and safe output signals 921.

Compared with a conventional FIFO, the FIFO synchronizer includes some duplicated circuitry in addition to speculative periodic synchronizers 950 to synchronize the head and tail pointer values. In particular, the pointer registers and pointer comparison logic is duplicated. Importantly, the storage elements within the FIFO, which are the bulk of the cost of the FIFO synchronizer, are not duplicated.

In some circumstances times during which the clock signals Clk 201 and Clk 202 are stable may be detected, and other times during which the period value T may vary as a result of variations in the Clk 201 and/or the Clk 202 signal may be detected. For example, in a system using dynamic voltage and frequency scaling (DVFS) the period value is stable for long durations of time and then varies smoothly for a short interval. In another circumstance, the Clk 201 and/or the Clk 202 signal varies in frequency to track variations in supply voltage, and a variation in the period value, T can be anticipated by use of a voltage sensor or through correlation with a logical event that is known to cause voltage variation.

In any circumstance where changes between a stable period value and a variable period value can be detected or anticipated, different values may be used for the bounds on period variation ΔT or δT to improve synchronization performance. When the period 204 value is stable, a low value of ΔT or δT may be used to reduce the latency incurred during synchronization. When the period 204 value is variable, a higher value of ΔT or δT may be used giving higher latency but safe synchronization. If different degrees of variation in the period 204 value and/or the frequency of either the Clk 201 or the Clk 202 signal can be detected (by a voltage sensor or by correlation) different values of ΔT or δT can be selected depending on the amount of variation detected. More specifically, different values of ΔT or δT may be selected by the speculative periodic synchronization unit 850 and/or 900 and used to compute the reduced timing margins.

Figure 9C:
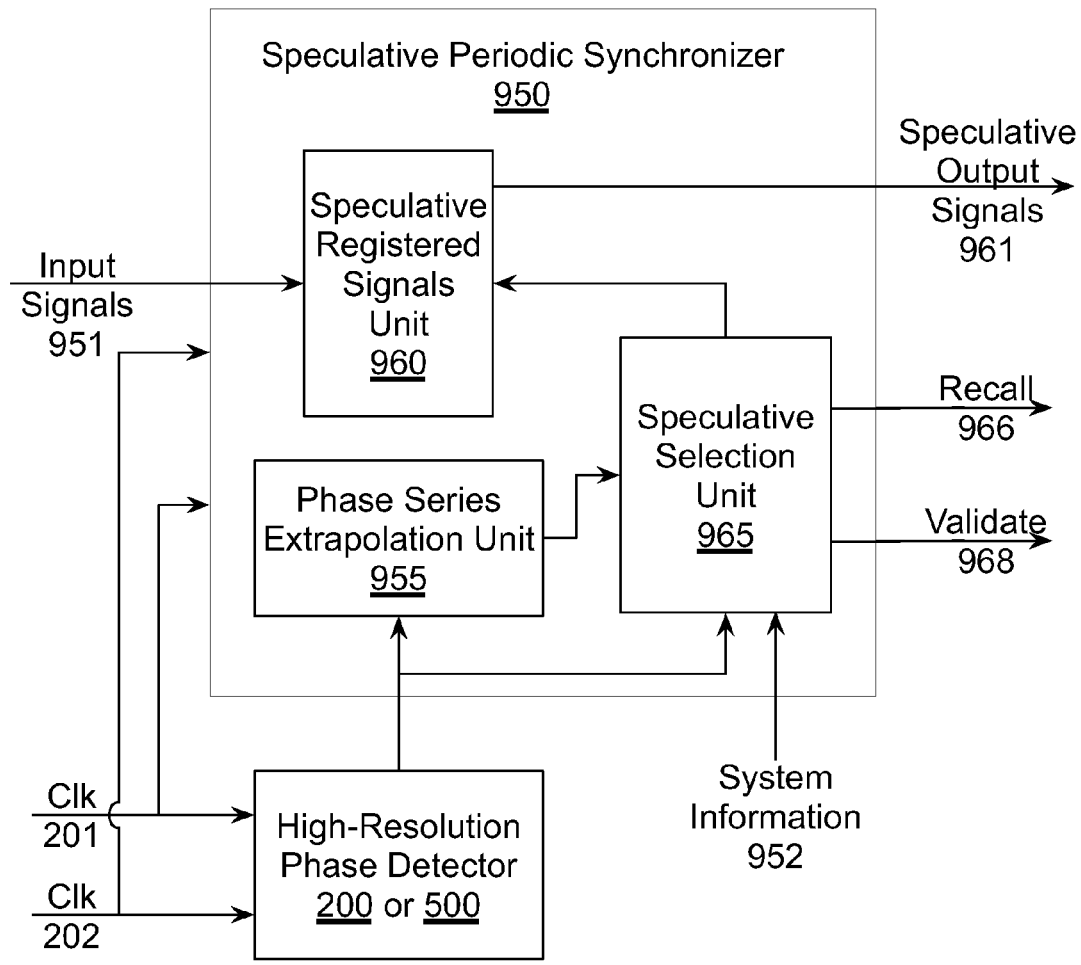
FIG. 9C illustrates another speculative periodic synchronizer, in accordance with one embodiment.

FIG. 9C illustrates a speculative periodic synchronizer 950, in accordance with one embodiment. The speculative periodic synchronizer 950 is coupled to a high-resolution phase detector 200 or 500 that generates the phase 203 value and the period 204 value. The speculative periodic synchronizer 950 includes a phase series extrapolation unit 955, a speculative registered signals unit 960, and a speculative selection unit 965. The phase series extrapolation unit 955 receives the phase 203 value and the period 204 value S cycles after the phase and period are measured and generates a series of extrapolated phase values.

The speculative selection unit 965 receives system information 952 that indicates whether the frequency of the Clk 201 and/or the Clk 202 is stable or varying. In one embodiment, the system information 952 indicates an amount by which the frequency of the Clk 201 and/or the Clk 202 may vary. The speculative selection unit 965 may use the system information 952 to compute the reduced timing margin. In one embodiment, when the system information 952 indicates high variations in the Clk 201 and/or the Clk 202 the speculative selection unit 965 may use a non-reduced timing margin. Note that the speculative periodic synchronizer 900 may also be adapted to receive the system information 952 and compute the reduced timing margin based on the system information 952.

The speculative selection unit 965 receives the phase 203 value and the series of extrapolated phase values and applies the computed reduced timing margin to compute a speculative series of extrapolated phase value intervals, from which a latest speculative extrapolated phase value interval is identified that does not includes a transition of the Clk 201 at t=0. The speculative selection unit 965 configures the speculative registered signals unit 960 to select the registered input signals 951 corresponding to the identified latest speculative extrapolated phase value interval to generate the speculative output signals 961. When the speculative selection unit 965 does not identify a speculative extrapolated phase value interval, the speculative output signals 961 are not updated and the validate signal 928.

The speculative selection unit 965 tracks the speculative output signals 961 that are output and generates a recall signal 966, as needed, to recall speculative output signals 961 that were previously output based on the corresponding phase 203 value that is received by the speculative selection unit 965 S cycles after the phase value is measured. Recalled speculative output signals 961 are discarded by the receiving logic. The validate signal 968 may be asserted up to S cycles after speculative output signals 961 are generated. The speculative registered signals unit 960 may include two or more registers, where each register is configured to sample the input signals 951 on a different transition of the Clk 202.

Figure 9D:
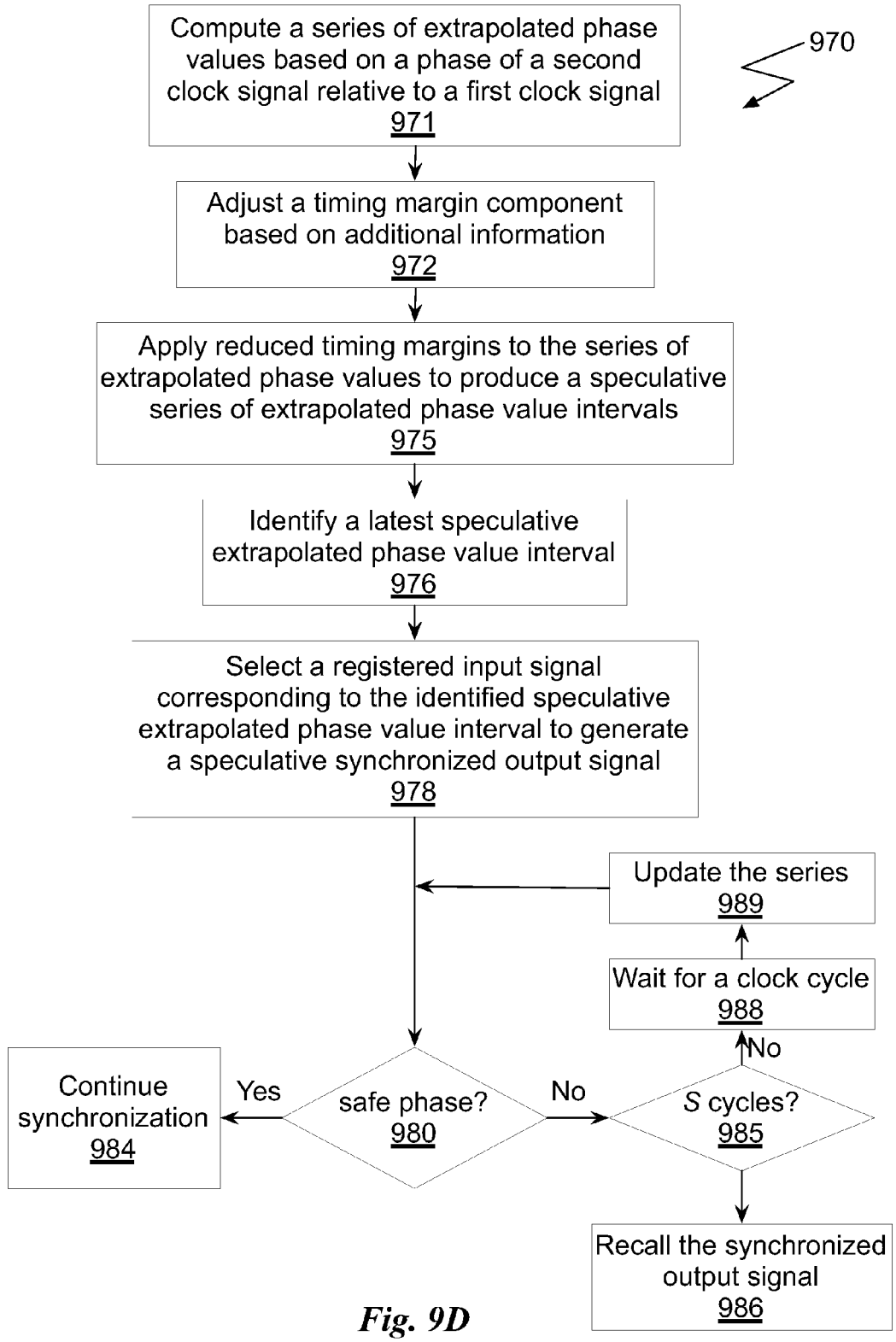
FIG. 9D illustrates another flowchart of a method for speculatively synchronizing signals, in accordance with one embodiment.

FIG. 9D illustrates another flowchart of a method 970 for speculatively synchronizing signals, in accordance with one embodiment. At step 971, the phase series extrapolation unit 955 computes a series of extrapolated phase values based on the phase 203 value and the period 204 value provided by the high-resolution phase detector 200 or 500. At step 972, the speculative selection unit 965 adjusts a timing margin component, e.g., ΔTs or δT, based on the system information 952 and computes a reduced timing margin.

At step 975, the speculative selection unit 965 applies the computed reduced timing margin to the series of extrapolated phase values to produce a speculative series of extrapolated phase value intervals. At step 976, the speculative selection unit 965 identifies a latest speculative extrapolated phase value interval that does not include a transition of the Clk 201 at t=0. At step 978, the speculative selection unit 965 configures the speculative registered signals unit 960 to select a registered input signal corresponding to the latest speculative extrapolated phase value interval to generate the speculative output signals 961.

At step 980, the speculative selection unit 965 determines if the identified latest speculative extrapolated phase value interval was safe. If, at step 980, the speculative selection unit 965 determines that the identified latest speculative extrapolated phase value interval was safe, then at step 984, the validate signal 968 is asserted and synchronization of the input signals 951 continues. Otherwise, at step 985, the speculative selection unit 965 determines if S cycles of the Clk 201 have occurred since the speculative output signals 961 were generated, and, if so, at step 986, the speculative selection unit 965 recalls the speculative output signals 961 generated S cycles earlier.

If, at step 985, S cycles of the Clk 201 have not occurred since the speculative output signals 961 were generated, then at step 988, the speculative selection unit 965 waits for another cycle of the Clk 201 to possibly obtain a phase 203 value corresponding to an extrapolated phase value. At the next cycle of the Clk 201, the series of extrapolated phase value intervals is updated when a new phase 203 value is known. As previously explained in conjunction with FIG. 8C, updating the series of extrapolated phase value intervals when a new phase 203 is received narrows the phase value intervals. At step 989, the narrowed extrapolated phase value intervals are checked to see if the speculative synchronization can be marked as non-speculative. Note, that the speculative selection unit 965 may be configured to generate the speculative output signals 961 while simultaneously performing one or more of steps 980, 984, 985, 986, and 988.

Figure 10:
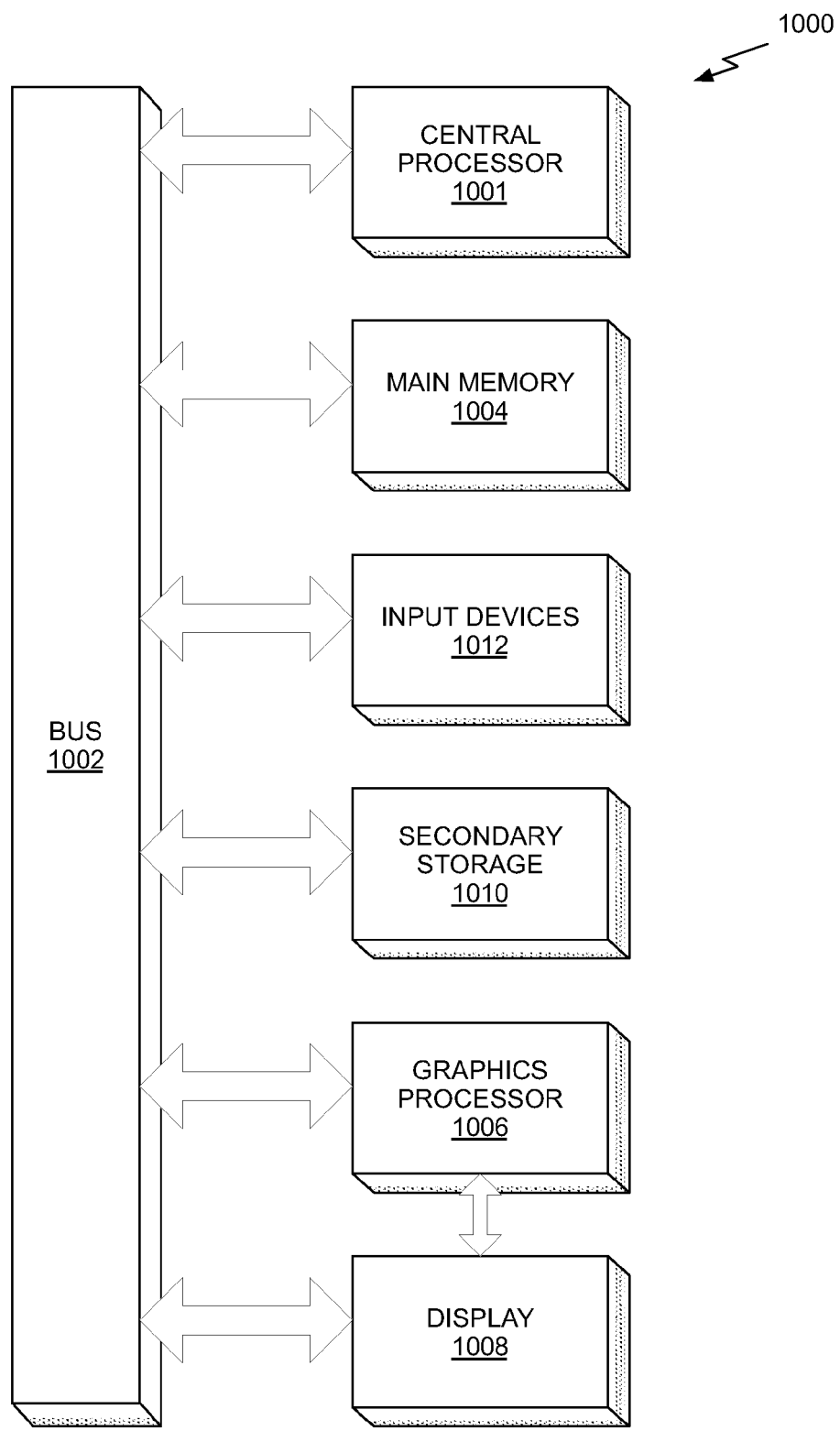
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments of the speculative periodic synchronizer 850, speculative periodic synchronizer 900, or speculative periodic synchronizer 950 may be implemented. As shown, the system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the integrated circuits shown in FIG. 10 may include the speculative periodic synchronizer 850, speculative periodic synchronizer 900, or speculative periodic synchronizer 950 for transmitting signals between different clock domains.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1004 and/or the secondary storage 1010. Such computer programs, when executed, enable the system 1000 to perform various functions. The memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a phase value representing a phase of a second clock signal relative to a first clock signal measured for each transition of the second clock signal;
receiving a period value representing a period of the second clock signal relative to the first clock signal measured for each transition of the second clock signal, wherein a frequency of at least one of the first clock signal and the second clock signal varies over time and the period value varies over time;
computing, based on the phase value and the period value, a series of extrapolated phase values of the second clock signal relative to the first clock signal corresponding to future transitions of the first clock signal;
determining a reduced timing margin based on the phase value and the period value;
generating a speculatively synchronized output signal in a domain of the first clock signal based on the reduced timing margin;
applying non-reduced timing margins to the series of extrapolated phase values to produce a safe series of extrapolated phase value intervals; and
generating, based on the safe series of extrapolated phase value intervals, a safe synchronized output signal that corresponds to the speculatively synchronized output signal.

2. The method of claim 1, further comprising:
determining that the speculatively synchronized output signal may be metastable and is not safe; and
discarding the speculatively synchronized output signal.

3. The method of claim 1, further comprising:
determining that the speculatively synchronized output signal is safe; and
indicating that the speculatively synchronized output signal is non-speculative and that irreversible operations may be performed by logic receiving the speculatively synchronized output signal.

4. The method of claim 1, further comprising applying the reduced timing margin to the series of extrapolated phase values to produce a speculative series of extrapolated phase value intervals, and wherein the speculatively synchronized output signal is generated based on the speculative series of extrapolated phase value intervals.

5. The method of claim 4, further comprising identifying a speculative extrapolated phase value interval in the series of speculative extrapolated phase value intervals that is closest to a next transition of the first clock signal without including the next transition as a closest speculative extrapolated phase value interval.

6. The method of claim 5, further comprising selecting a sampled version of an input signal corresponding to the closest speculative extrapolated phase value interval for output as the speculatively synchronized output signal.

7. The method of claim 1, further comprising:
comparing the safe synchronized output signal to the speculatively synchronized output signal; and
indicating that the speculatively synchronized output signal is non-speculative when the safe synchronized output signal matches the speculatively synchronized output signal.

8. The method of claim 1, further comprising:
comparing the safe synchronized output signal to the speculatively synchronized output signal; and
replacing the speculatively synchronized output signal with the safe synchronized output signal when the safe synchronized output signal does not match the speculatively synchronized output signal.

9. The method of claim 1, wherein each extrapolated phase value in the series of extrapolated phase values is associated with a different transition in a sequence of transitions of the second clock signal.

10. The method of claim 1, further comprising:
determining, after one or more cycles of the first clock signal, that the speculatively synchronized output signal is safe; and
validating the speculatively synchronized output signal indicating the irreversible operations may be performed by logic receiving the speculatively synchronized output signal.

11. The method of claim 1, wherein the reduced timing margin varies over time.

12. The method of claim 1, wherein a component of the reduced timing margin is a slope of the period value.

13. The method of claim 1, wherein a component of the reduced timing margin is a measurement error associated with at least one of the phase value and the period value.

14. The method of claim 1, wherein a component of the reduced timing margin is a variation of at least one of the first clock signal and the second clock signal due to voltage or current transient.

15. An integrated circuit comprising:
first circuitry operating in a first clock domain corresponding to a first clock signal;
second circuitry operating in a second clock domain corresponding to a second clock signal; and
a speculative synchronization circuit configured to:
receive a phase value representing a phase of the second clock signal relative to the first clock signal measured for each transition of the second clock signal;
receive a period value representing a period of the second clock signal relative to the first clock signal measured for each transition of the second clock signal, wherein a frequency of at least one of the first clock signal and the second clock signal varies over time and the period value varies over time;
compute, based on the phase value and the period value, a series of extrapolated phase values of the second clock signal relative to the first clock signal corresponding to future transitions of the first clock signal;
determine a reduced timing margin based on the phase value and the period value;
generate a speculatively synchronized output signal in the first clock domain based on the reduced timing margin;
apply non-reduced timing margins to the series of extrapolated phase values to produce a safe series of extrapolated phase value intervals; and
generate, based on the safe series of extrapolated phase value intervals, a safe synchronized output signal that corresponds to the speculatively synchronized output signal.

16. The integrated circuit of claim 15, wherein the speculative synchronization circuit is further configured to:
determine whether the speculatively synchronized output signal may be metastable and is not safe; and
recall the speculatively synchronized output signal when the speculatively synchronized output signal is not safe.

17. The integrated circuit of claim 15, wherein the synchronization circuit is further configured to:
determine that the speculatively synchronized output signal is safe; and
indicate that the speculatively synchronized output signal is non-speculative and that irreversible operations may be performed by logic receiving the speculatively synchronized output signal.

18. The integrated circuit of claim 15, wherein the speculative synchronization circuit is further configured to determine, after one or more cycles of the first clock signal, whether the speculatively synchronized output signal is safe.

* * * * *